(12) United States Patent
Watanabe et al.

(10) Patent No.: US 11,226,593 B2
(45) Date of Patent: Jan. 18, 2022

(54) ANALOG ELECTRONIC WATCH SYSTEM AND ANALOG ELECTRONIC WATCH

(71) Applicant: CITIZEN WATCH CO., LTD., Tokyo (JP)

(72) Inventors: Makoto Watanabe, Tokorozawa (JP); Katsuyoshi Aihara, Kawagoe (JP); Daisuke Matsuoh, Nishitokyo (JP); Daisuke Yamada, Tokyo (JP); Ryutaro Uemura, Nishitokyo (JP)

(73) Assignee: CITIZEN WATCH CO., LTD., Tokyo (JP)

( * ) Notice: Subject to any disclaimer, the term of this patent is extended or adjusted under 35 U.S.C. 154(b) by 316 days.

(21) Appl. No.: 16/496,473

(22) PCT Filed: Mar. 28, 2018

(86) PCT No.: PCT/JP2018/012728
§ 371 (c)(1),
(2) Date: Sep. 23, 2019

(87) PCT Pub. No.: WO2018/181467
PCT Pub. Date: Oct. 4, 2018

(65) Prior Publication Data
US 2020/0379411 A1    Dec. 3, 2020

(51) Int. Cl.
*G04C 9/00* (2006.01)
*G04B 19/04* (2006.01)

(52) U.S. Cl.
CPC ............... *G04C 9/02* (2013.01); *G04B 19/04* (2013.01)

(58) Field of Classification Search
CPC . G04C 9/02; G04C 9/00; G04C 10/02; G04C 19/00; G04C 3/146; G04B 19/04;
(Continued)

(56) References Cited

U.S. PATENT DOCUMENTS 9,837,705 B2 * 12/2017 Aizawa ................. G04G 21/04
10,009,116 B2 * 6/2018 Baba ..................... G04R 20/30
(Continued)

FOREIGN PATENT DOCUMENTS

CN      105446130 A    3/2016
JP    2015-078943 A    4/2015
(Continued)

OTHER PUBLICATIONS

International Search Report of PCT/JP2018/012728 dated Jun. 26, 2018 [PCT/ISA/210].
(Continued)

*Primary Examiner* — Edwin A. Leon
(74) *Attorney, Agent, or Firm* — Sughrue Mion, PLLC

(57) ABSTRACT

An analog electronic watch includes watch's internal time, and controls rotation of a group of indicators based on the watch's internal time. A terminal appliance stops the rotation of the group of indicators, generates an image of the indicators and the dial plate with an imaging unit, detects current display positions of the group of indicators in identification areas as part of the image of the indicators and the dial plate, generates current display time information based on the current display positions, and generates display time correction information based on a difference between the current display time information and the watch's internal time information. The analog electronic watch corrects the display positions of the group of indicators based on the display time correction information. There are provided an analog electronic watch system and an analog electronic watch that can reduce a time required for display time correction.

7 Claims, 12 Drawing Sheets

(58) Field of Classification Search
CPC ........ G04B 20/26; G04R 40/06; G04R 20/28;
G04R 20/26; G04G 5/00; G04G 5/002;
G04G 7/00; G04G 19/00; G04G 21/04;
G04G 21/00
USPC ........................................................... 368/9
See application file for complete search history.

(56) References Cited

U.S. PATENT DOCUMENTS

| | | | |
|---|---|---|---|
| 10,095,189 B2 * | 10/2018 | Masserot | ............... G04C 3/146 |
| 2015/0362893 A1 | 12/2015 | Masserot et al. | |
| 2016/0266554 A1 | 9/2016 | Ogasawara et al. | |
| 2019/0250567 A1 | 8/2019 | Wang et al. | |

FOREIGN PATENT DOCUMENTS

| | | |
|---|---|---|
| JP | 2016-057192 A | 4/2016 |
| WO | 2015/072281 A1 | 5/2015 |

OTHER PUBLICATIONS

Communication dated Oct. 26, 2020, from The State Intellectual Property Office of the P.R. of China in Application No. 201880021576.2.

* cited by examiner

US 11,226,593 B2

ANALOG ELECTRONIC WATCH SYSTEM AND ANALOG ELECTRONIC WATCH

CROSS REFERENCE TO RELATED APPLICATIONS

This application is a National Stage of International Application No. PCT/JP2018/012728, filed Mar. 28, 2018, claiming priority to Japanese Patent Application No. 2017-065390, filed Mar. 29, 2017.

FIELD

The present invention relates to an analog electronic watch system and an analog electronic watch.

BACKGROUND

There have been developed analog electronic watches that can transmit/receive information such as time information about time to/from a terminal appliance held by a user via wireless communication. The analog electronic watch causes a step motor to rotate a group of indicators such as a second hand, a minute hand, an hour hand, and a date plate to cause the group of indicators to be positioned at display positions based on internal time, and causes a user to recognize current time.

The group of indicators of the analog electronic watch may be misaligned due to various external factors in some cases. In a case in which the group of indicators are misaligned, current internal time is shifted from current display time based on current display positions of the group of indicators. Thus, the analog electronic watch has a function of correcting display time (refer to Patent Literature 1). In the related art, in a case of performing display time correction, the group of indicators are rotated from the current display positions to reference positions based on positional information of the group of indicators. In a case of manual correction performed by a user, when display time correction is started by an instruction from the user, current position information is compared with reference position information corresponding to the reference positions, the group of indicators are rotated to the display positions based on the reference position information, and an operation unit of the analog electronic watch is operated. In a case in which the group of indicators are shifted from the reference positions, the group of indicators are adjusted to be positioned at the reference positions, and the group of indicators are rotated by an instruction from the user based on the internal time. Similarly, in a case of automatic correction by the terminal appliance, the group of indicators are rotated to the display positions based on the reference position information by an instruction from the user, and the user images the dial plate including the group of indicators with the terminal appliance to recognize the display positions of the group of indicators in a generated image. If it is determined that the group of indicators are shifted from the reference positions, display time correction information is transmitted to the analog electronic watch, the analog electronic watch that has received the display time correction information automatically adjusts the group of indicators to be positioned at the reference positions based on the display time correction information, and the group of indicators are rotated by an instruction from the user based on the internal time.

CITATION LIST

Patent Literature

Patent Literature 1: Japanese Patent Application Laid-open No. 2015-78943

SUMMARY

Technical Problem

A condition for performing display time correction of the analog electronic watch described above is that the group of indicators are rotated to the display positions based on the reference position information. In a case in which time corresponding to the current display positions of the group of indicators largely differs from time corresponding to the reference positions, a rotating operation time for rotating the group of indicators to the display positions based on the reference position information and a rotating operation time for rotating the group of indicators from the reference positions to the display positions corresponding to the current internal time are prolonged. Accordingly, a time required for display time correction is prolonged, and a time during which the analog electronic watch cannot exhibit a primary function is prolonged, which may be disadvantageous for the user.

The present invention is made in view of such a situation, and provides an analog electronic watch system and an analog electronic watch that can reduce the time required for display time correction.

Solution to Problem

In order to solve the above mentioned problem and achieve the object, an analog electronic watch system according to the present embodiment includes an analog electronic watch that includes a dial plate on which indexes are formed, and one or more indicators configured to rotate on the dial plate; and a terminal appliance that includes a communication unit on a terminal side configured to be able to transmit/receive at least time information about time to/from an external appliance, an imaging unit configured to image the dial plate, and generate an image of the indicators and the dial plate including an image corresponding to the indicators and the dial plate, and a controller on the terminal side configured to detect current display positions of the indicators based on the indexes in the image of the indicators and the dial plate, generate current display time information based on the current display positions, and generate display time correction information based on a difference between the current display time information and watch's internal time information received from the analog electronic watch, wherein the controller on the terminal side outputs, to the analog electronic watch, a rotation stop signal for stopping rotation of the indicators before performing imaging with the imaging unit, detects the current display positions of the indicators within identification areas that are part of the image of the indicators and the dial plate and include the indexes and expected display positions of the indicators based on the watch's internal time information, and outputs the display time correction information to the analog electronic watch, and the analog electronic watch stops the rotation of the indicators based on the rotation stop signal, and corrects display positions of the indicators based on the display time correction information.

In order to solve the above mentioned problem and achieve the object, an analog electronic watch according to the present embodiment includes a dial plate on which indexes are formed; one or more indicators configured to rotate on the dial plate; a driving mechanism unit configured to rotate the indicators; a communication unit on a watch side configured to be able to transmit/receive at least time information about time to/from an external appliance; and a controller on the watch side that includes at least watch's internal time, and is configured to control rotational driving of the indicators performed by the driving mechanism unit based on the watch's internal time, wherein the controller on the watch side stops a rotation of the indicators rotated by the driving mechanism unit based on a rotation stop signal from a terminal appliance, and corrects display positions of the indicators based on display time correction information from the terminal appliance that is based on a difference between current display time information that is generated based on current display positions of the indicators and watch's internal time information received from the analog electronic watch, the current display positions being detected in identification areas as part of an image of the indicators and the dial plate including an image corresponding to the indicators and the dial plate, the identification areas including the indexes and expected display positions of the indicators based on watch's internal time information.

Advantageous Effects of Invention

The analog electronic watch system and the analog electronic watch according to the present invention stop the rotation of the indicators in performing display time correction, and detect the current positions of the indicators in identification areas as part of an image of the indicators and the dial plate, so that display time correction can be performed without rotating the indicators based on the reference position information. Additionally, display time correction can be performed without detecting the display positions of the indicators in the entire area of the image of the indicators and the dial plate. Due to this, an effect of reducing time required for display time correction can be obtained.

DESCRIPTION OF EMBODIMENTS

The following describes the present invention in detail with reference to the drawings. The present invention is not limited to the following embodiment. Components in the following embodiment include a component that is easily conceivable by those skilled in the art or substantially the same component.

Embodiment

Figure 1:
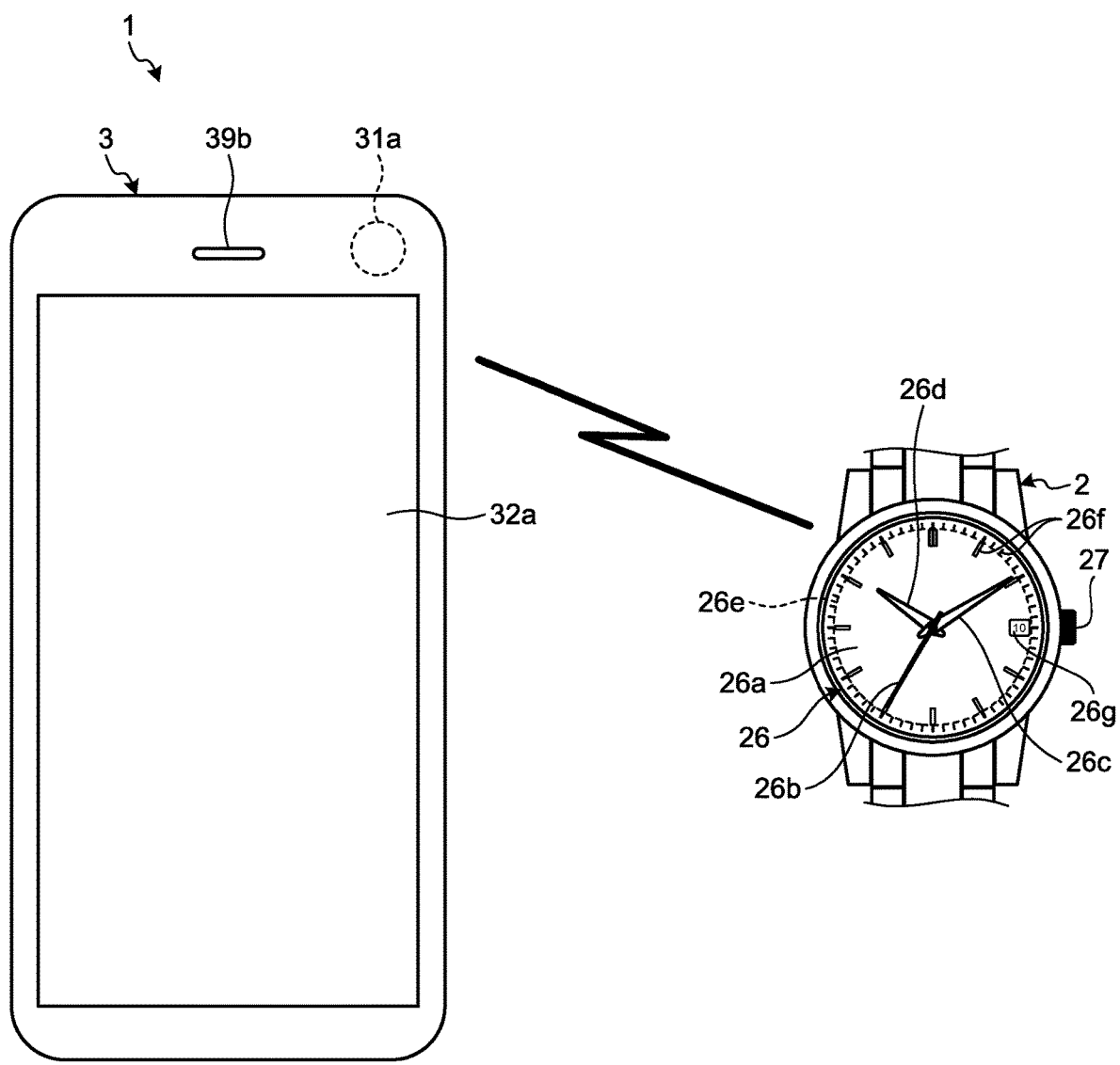
FIG. 1 is an entire configuration diagram of an analog electronic watch system according to an embodiment.
Figure 2:
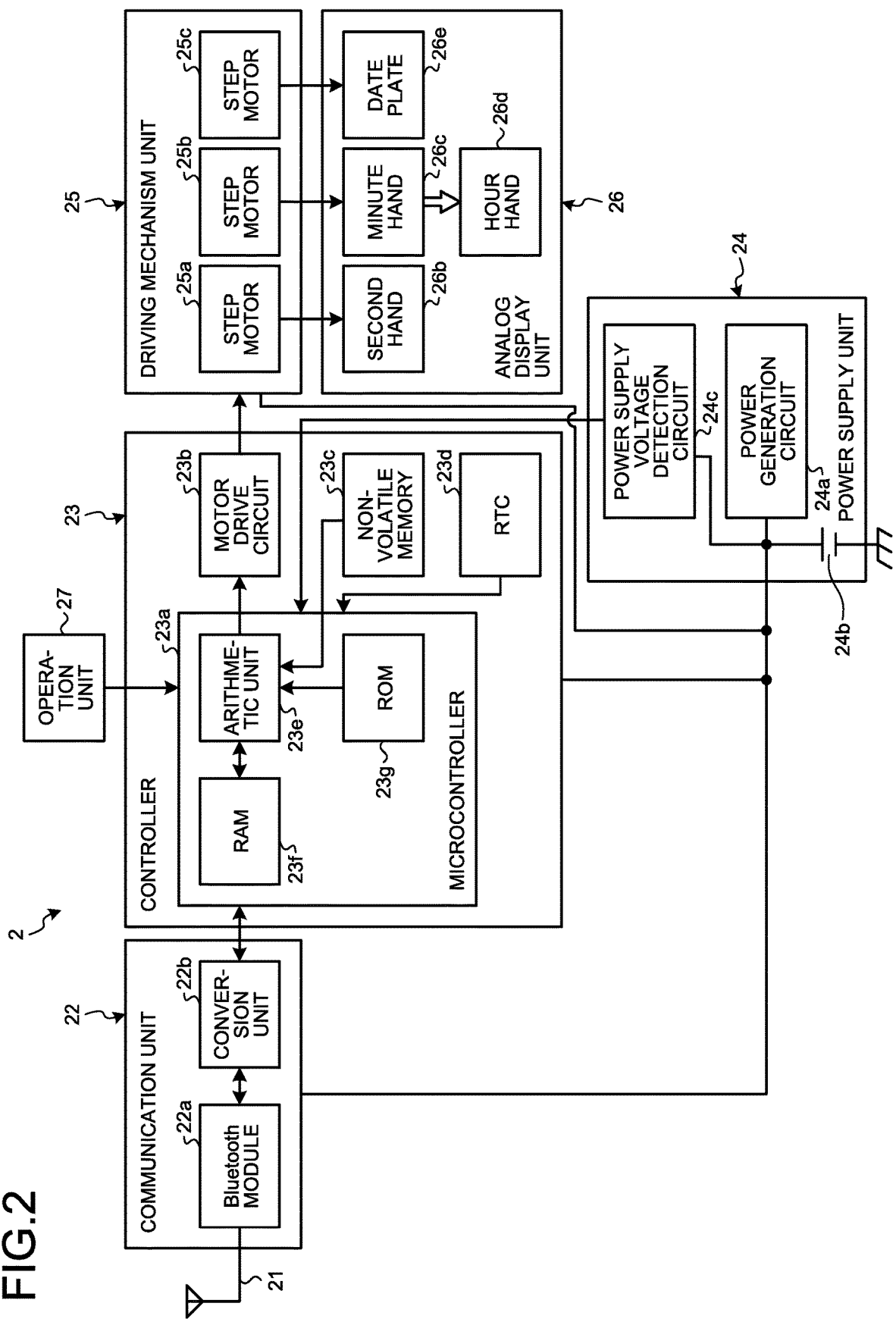
FIG. 2 is a block diagram of an analog electronic watch according to the embodiment.
Figure 3:
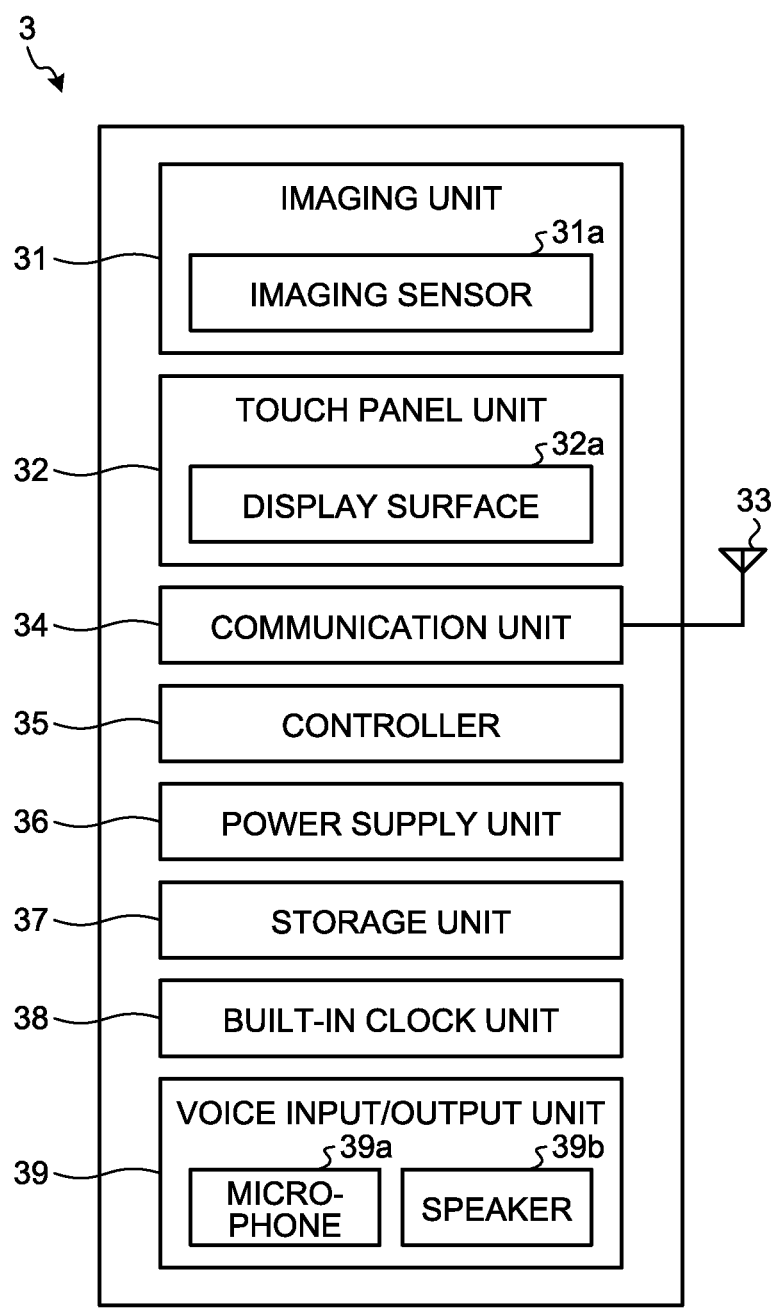
FIG. 3 is a block diagram of a terminal appliance according to the embodiment.
Figure 4:
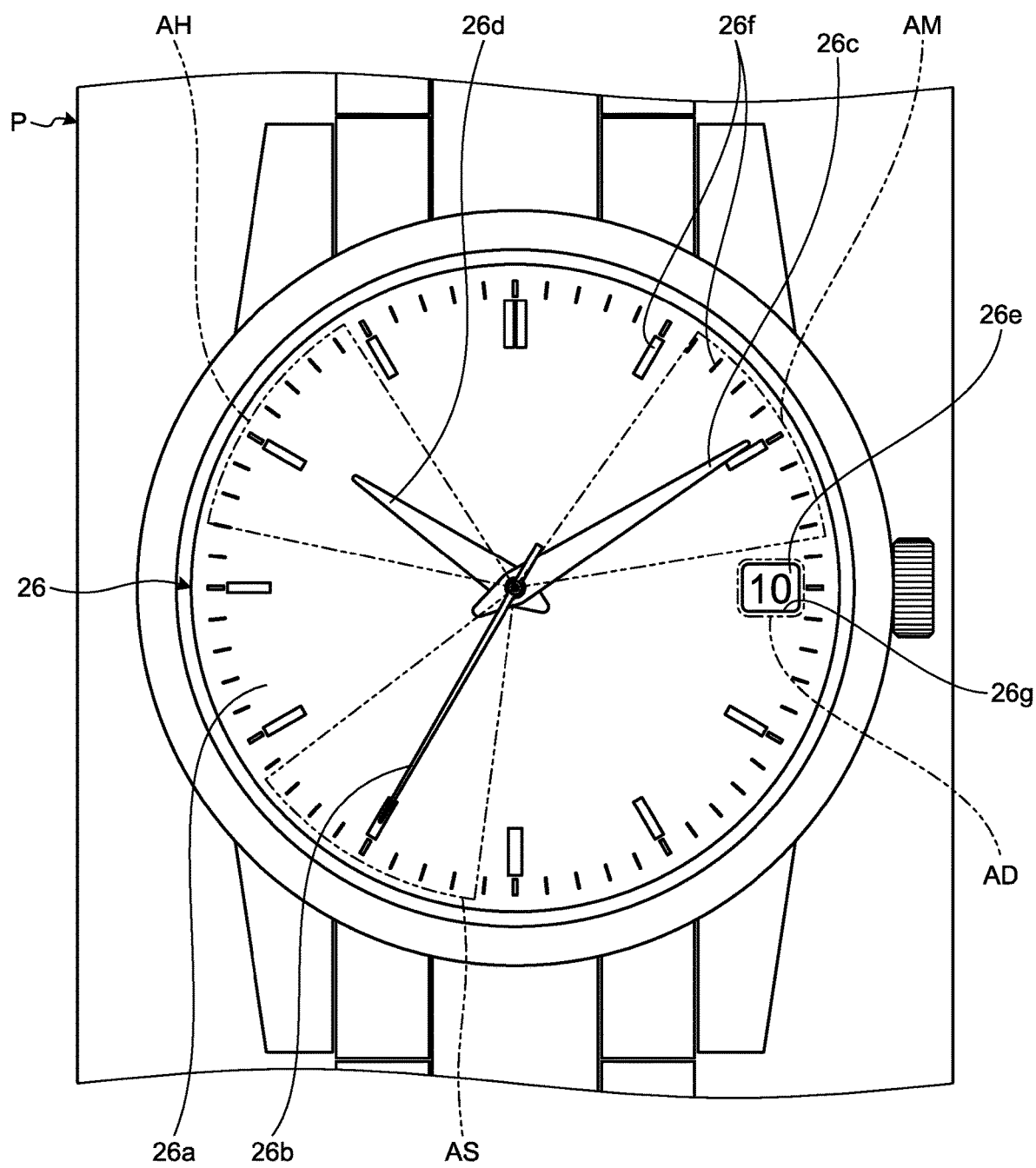
FIG. 4 is a diagram illustrating an image of indicators and a dial plate, and identification areas (normal) imaged by the terminal appliance.

FIG. 1 is an entire configuration diagram of an analog electronic watch system according to an embodiment. FIG. 2 is a block diagram of an analog electronic watch according to the embodiment. FIG. 3 is a block diagram of a terminal appliance according to a first embodiment. FIG. 4 is a diagram illustrating an image of indicators and a dial plate, and identification areas (normal) imaged by the terminal appliance.

An analog electronic watch system 1 according to the embodiment includes an analog electronic watch 2 and a terminal appliance 3. In the analog electronic watch system 1, the analog electronic watch 2 transmits/receives time information about time to/from the terminal appliance 3 to perform display time correction on the analog electronic watch 2. The following describes the analog electronic watch system 1 according to the present embodiment in a case of using Bluetooth (registered trademark), which is one of short-range wireless communication units, as a communication unit between the analog electronic watch 2 and the terminal appliance 3, but the communication unit is not limited thereto. Alternatively, another short-range wireless communication unit, a wide-area communication network, and the like may be used.

The analog electronic watch 2 is a watch including an analog display unit 26 described later, and causes a user to recognize time corresponding to a positional relation between a dial plate 26a and indicators including a second hand 26b, a minute hand 26c, an hour hand 26d, and a date plate 26e (hereinafter, simply referred to as a "group of indicators 26b to 26e" in some cases) of the analog display unit 26. The analog electronic watch 2 includes an antenna 21, a communication unit 22, a controller 23, a power supply unit 24, a driving mechanism unit 25, an analog display unit 26, and an operation unit 27. The analog electronic watch 2 according to the present embodiment is described as a wristwatch worn by the user on his/her wrist, but may be a desk clock or a wall clock.

The antenna 21 constitutes part of a communication unit on the watch side, and receives radio waves of a Bluetooth standard as one of the short-range wireless communication standards. The antenna 21 is connected to the communication unit 22.

The communication unit 22 constitutes part of the communication unit on the watch side, and can at least transmit/receive the time information about time to/from an external appliance. The communication unit 22 includes a Bluetooth module 22a and a conversion unit 22b. The Bluetooth module 22a is a communication control module for performing Bluetooth communication with the terminal appliance 3 as the external appliance via the antenna 21. The conversion unit 22b converts a serial signal into a parallel signal, or converts a parallel signal into a serial signal. Transmission information (transmission data) output from the controller 23 and transmitted to the external appliance is subjected to signal processing such as serial/parallel conversion performed by the conversion unit 22b, and transmitted from the Bluetooth module 22a to the terminal appliance 3 via the antenna 21. On the other hand, reception information (reception data) received by the Bluetooth module 22a via the antenna 21 is subjected to signal processing such as serial/parallel conversion performed by the conversion unit 22b, and output to the controller 23.

The controller 23 is a controller on the watch side, which controls various circuits and mechanisms included in the analog electronic watch 2, and at least controls rotation of the group of indicators 26b to 26e rotated by the driving mechanism unit 25 based on watch's internal time. The controller 23 also stores therein reference position information of the group of indicators 26b to 26e, and updates the reference position information. The controller 23 includes a microcontroller 23a, a motor drive circuit 23b, a nonvolatile memory 23c, and a real time clock (RTC) 23d.

The microcontroller 23a includes an arithmetic unit 23e, a random access memory (RAM) 23f, and a read only memory (ROM) 23g. The microcontroller 23a is constituted of one integrated circuit. The arithmetic unit 23e counts pulses included in a clock signal output from the RTC 23d with a counter (not illustrated). The arithmetic unit 23e performs various kinds of information processing in accordance with a computer program stored in the ROM 23g. The arithmetic unit 23e according to the present embodiment performs display time correction processing. The arithmetic unit 23e determines watch's internal time corresponding to the counted number of pulses. The RAM 23f functions as a work memory of the arithmetic unit 23e, and information as a processing target of the arithmetic unit 23e is written into the RAM 23f. The RAM 23f also stores therein current position information of the group of indicators 26b to 26e based on a control operation for the group of indicators 26b to 26e performed by the controller 23 by causing the driving mechanism unit 25 to control rotation of the group of indicators 26b to 26e based on the watch's internal time.

The motor drive circuit 23b outputs a drive signal for driving each of step motors 25a to 25c (described later) included in the driving mechanism unit 25 based on the watch's internal time determined by the arithmetic unit 23e.

The nonvolatile memory 23c is a memory that holds information in a case in which electric power is not supplied to the controller 23 by the power supply unit 24, a case of restarting the analog electronic watch 2, and the like. The nonvolatile memory 23c stores therein the reference position information of the group of indicators 26b to 26e. The reference position information according to the present embodiment is information based on reference positions set in advance. In this case, the reference positions are, for example, positions at which the second hand 26b, the minute hand 26c, and the hour hand 26d indicate 12 o'clock on the dial plate 26a, and positions at which "1" of the date plate 26e can be visually recognized through a date window 26g of the dial plate 26a. The reference position information is initial value information about the respective positions of the group of indicators 26b to 26e at reference time (1st day, 12:00:00 am). The nonvolatile memory 23c is, for example, a flash memory or an EEPROM.

The RTC 23d outputs, to the microcontroller 23a, a clock signal used for timing inside the analog electronic watch 2.

The power supply unit 24 is a power source of the analog electronic watch 2, and supplies electric power to respective components, for example, the communication unit 22, the controller 23, and the driving mechanism unit 25, within the analog electronic watch 2. The power supply unit 24 includes a power generation circuit 24a, a battery 24b, and a power supply voltage detection circuit 24c.

The power generation circuit 24a includes a photovoltaic power generation element arranged on a lower side of the dial plate 26a (described later) of the analog display unit 26. The power generation circuit 24a generates electric power by using external light such as sunlight emitted to the dial plate 26a, and supplies the generated electric power to the battery 24b.

The battery 24b is a secondary cell that can be charged and discharged such as a lithium ion battery. The battery 24b is charged with electric power generated by the power generation circuit 24a, or discharges electric power to supply electric power to the components within the analog electronic watch 2 with a battery management circuit (not illustrated) that manages charging and discharging.

The power supply voltage detection circuit 24c is a circuit that measures voltage of the battery 24b. A signal indicating the measured voltage is output to the microcontroller 23a.

The driving mechanism unit 25 includes the step motors 25a, 25b, and 25c that are rotationally driven (for example, by 180 degrees for each control pulse) in accordance with the drive signal output from the motor drive circuit 23b, and a wheel train (not illustrated). The driving mechanism unit 25 rotates the group of indicators 26b to 26e by a rotation amount per one time that is set in advance by transmitting rotational force of each of the step motors 25a to 25c by the wheel train. In the present embodiment, the second hand 26b is rotated by the step motor 25a, the minute hand 26c and the hour hand 26d are rotated by the step motor 25b, and the date plate 26e is rotated by the step motor 25c. In this case, the minute hand 26c and the hour hand 26d rotate in conjunction with each other, and the hour hand 26d rotates in conjunction with the minute hand 26c at a ratio of 1/12 of the rotational speed of the minute hand 26c. The respective step motors 25a to 25c rotate the second hand 26b by 6 degrees, the minute hand 26c by 1 degree, and the date plate 26e by 360/(31×170) degrees, as a rotation amount per one time.

The analog display unit 26 is arranged in the analog electronic watch 2 at a position that can be visually recognized from the outside. As illustrated in FIG. 1 and FIG. 2, the analog display unit 26 includes the dial plate 26a, the second hand 26b, the minute hand 26c, the hour hand 26d, and the date plate 26e. The dial plate 26a is formed in a disk shape, and transmits external light. Indexes 26f and the date window 26g are formed on the dial plate 26a. The indexes 26f cause the user to recognize current time using relative positions of the second hand 26b, the minute hand 26c, and the hour hand 26d (hereinafter, simply referred to as "three hands 26b to 26d" in some cases). The indexes 26f are formed on the dial plate 26a at regular intervals in a circumferential direction. Some of the indexes 26f according to the present embodiment are formed at regular intervals of 6 degrees, and some of the indexes 26f are formed at regular intervals of 30 degrees. The date window 26g is formed at a position opposed to the date plate 26e in a vertical direction of the dial plate 26a, and vertically passes through the dial plate 26a. The date window 26g according to the present embodiment has a rectangular shape, and is formed at a position of "three o'clock" on the dial plate 26a. The second hand 26b, the minute hand 26c, and the hour hand 26d are supported by a frame (not illustrated) in a rotatable manner, and coaxially rotate on an upper side of the dial plate 26a, for example, at a center part of the dial plate 26a. The second hand 26b, the minute hand 26c, and the hour hand 26d indicate positions corresponding to the indexes 26f on the dial plate 26a to indicate a second, a minute, and an hour of display time. The date plate 26e is supported by a frame (not illustrated) in a rotatable manner, and rotates on a lower side of the dial plate 26a. The date plate 26e can be exposed to the upper side of the dial plate 26a through the date window 26g, and indicates a "date" of the time via the date window 26g. The date plate 26e is formed to have an identification pattern for identifying a date such that numerals of 1 to 31 are arranged at regular intervals in the circumferential direction in the present embodiment. The second hand 26b indicates a "second" of the current time, the minute hand 26c indicates a "minute" of the current time, and the hour hand 26d indicates an "hour" of the current time. The three hands 26b to 26d according to the present embodiment are formed to have lengths to be shorter in order of the minute hand 26c, the second hand 26b, and the hour hand 26d from the center of the dial plate 26a in a radial direction in rotation.

The operation unit 27 is, for example, a crown or an operation button. When the user operates the operation unit 27, operation content corresponding to an input operation is output to the controller 23. In this case, the controller 23 performs various kinds of processing in accordance with the operation content.

The terminal appliance 3 is separated from the analog electronic watch 2. In the terminal appliance 3, a display time correction application (hereinafter, simply referred to as an "application" in some cases) corresponding to a display time correction function of the analog electronic watch system 1 is stored in a storage unit 37 of the terminal appliance 3 in an initial state (at the time of factory shipment), or stored in the storage unit 37 by being downloaded from an external server or read from a recording medium connected thereto. The terminal appliance 3 according to the present embodiment is a portable terminal such as a smartphone and a tablet having a function as the analog electronic watch system 1 as part of functions thereof, and having other functions such as a telephone function and an Internet connecting function. However, the terminal appliance 3 is not limited thereto, and may be a personal computer such as a notebook computer. As illustrated in FIG. 1 and FIG. 3, the terminal appliance 3 includes an imaging unit 31, a touch panel unit 32, an antenna 33, a communication unit 34, a controller 35, a power supply unit 36, the storage unit 37, a built-in clock unit 38, and a voice input/output unit 39. For example, a vibration generation unit and the like may be added to the terminal appliance 3 depending on a required function.

The imaging unit 31 images the dial plate 26a of the analog electronic watch 2, and generates an image P of the indicators and the dial plate including an image corresponding to the group of indicators 26b to 26e and the dial plate 26a as illustrated in FIG. 4. The imaging unit 31 is arranged on a back surface of the terminal appliance 3 (a surface opposite to a surface on which a display surface 32a (described later) of the touch panel unit 32 is arranged), and includes an imaging sensor 31a such as a CCD image sensor or a CMOS image sensor in which imaging elements driven by electric power from the power supply unit 36 are arranged in a plane shape. The imaging sensor 31a generates the image P of the indicators and the dial plate based on an output value corresponding to incident light for each time of exposure, and outputs the image P of the indicators and the dial plate to the controller 35 as an image signal. The imaging unit 31 controls driving of each imaging element based on an imaging condition of the imaging sensor 31a, that is, an exposure timing, an exposure time, and the like. In this case, the image P of the indicators and the dial plate includes an image corresponding to the dial plate 26a, an image corresponding to the second hand 26b, an image corresponding to the minute hand 26c, an image corresponding to the hour hand 26d, an image corresponding to a portion of the date plate 26e exposed through the date window 26g, and an image corresponding to the indexes 26f.

The touch panel unit 32 is a display that functions as a display unit and an input unit. The touch panel unit 32 includes the display surface 32a as a function of the display unit, and displays, on the display surface 32a, the image P of the indicators and the dial plate imaged by the imaging unit 31. The touch panel unit 32 is a display such as a liquid crystal display and an organic EL display that is arranged on the surface of the terminal appliance 3 and is driven by electric power from the power supply unit 36. The touch panel unit 32 displays the image P of the indicators and the dial plate as the image taken by the imaging unit 31 based on an image data signal output from the controller 35. As the function of the input unit, when the user presses any position of the touch panel unit 32, an operation input signal corresponding to an operation input position is output to the controller 35.

The antenna 33 constitutes part of a communication unit on the terminal side, and at least receives radio waves of a Bluetooth standard. The antenna 33 is connected to the communication unit 34.

The communication unit 34 constitutes part of the communication unit on the terminal side, and can transmit/receive at least the time information about time to/from the external appliance. Similarly to the communication unit 22, the communication unit 34 according to the present embodiment includes a conversion unit and a Bluetooth module (not illustrated) for performing Bluetooth communication with the analog electronic watch 2 as the external appliance via the antenna 33. Transmission information (transmission data) output from the controller 35, for example, the time information is subjected to signal processing performed by the conversion unit of the communication unit 34, and transmitted from the Bluetooth module to the analog electronic watch 2 via the antenna 33. On the other hand, reception information (reception data) received by the Bluetooth module of the communication unit 34 via the antenna 33, for example, the time information is subjected to signal processing performed by the conversion unit, and output to the controller 35. The communication unit 34 can also transmit/receive information to/from base stations installed at various places via wireless communication.

The controller 35 is a controller on the terminal side, and controls appliances constituting the terminal appliance 3 including the imaging unit 31. The controller 35 executes the application described above to stop the rotation of the group of indicators 26b to 26e of the analog electronic watch 2, and implements imaging of the analog display unit 26 in a rotation stopped state of the analog electronic watch 2. The controller 35 also performs image processing on the image P of the indicators and the dial plate generated by the imaging unit 31 to detect current display positions of the group of indicators 26b to 26e, and generates current display time information. The controller 35 also compares watch's internal time information received from the analog electronic watch 2 with the current display time information detected from the image P of the indicators and the dial plate generated by the imaging unit 31, and outputs display time correction information to the analog electronic watch 2. In this case, a hardware configuration of the controller 35 is the same as a hardware configuration of a controller of a well-known terminal appliance, and includes, for example, an arithmetic unit, a RAM, and a ROM (not illustrated).

The power supply unit 36 is a power source of the terminal appliance 3, and supplies electric power to various appliances constituting the terminal appliance 3 such as the imaging unit 31, the touch panel unit 32, the communication unit 34, the controller 35, the storage unit 37, the built-in clock unit 38, and the voice input/output unit 39. The power supply unit 36 at least includes a battery that can be charged and discharged.

The storage unit 37 stores therein various computer programs including a computer program corresponding to the display time correction application executed by the controller 35, initial setting information, and the like. The storage unit 37 is, for example, a flash memory or an EEPROM.

The built-in clock unit 38 is a counter that counts terminal's internal time to be held therein. In the terminal appliance 3, the terminal's internal time is read out by the controller 35, and displayed on the display surface 32a of the touch panel unit 32. In the terminal appliance 3, the controller 35 compares the terminal's internal time with setting time to perform various operations. When communication between the terminal appliance 3 and the base station is performed by the communication unit 34, the terminal's internal time is updated by the controller 35 whenever necessary based on time information on a base station side acquired from the base station.

The voice input/output unit 39 transmits information mainly between the user and the terminal appliance 3 via voice. The voice input/output unit 39 includes a microphone 39a and a speaker 39b. The microphone 39a mainly receives an input of voice of the user, and converts sound waves into a voice signal to be output to the controller 35. The speaker 39b mainly outputs voice to the user, and converts the voice signal output from the controller 35 and the like into sound waves to be output to the outside of the terminal appliance 3.

Figure 5:
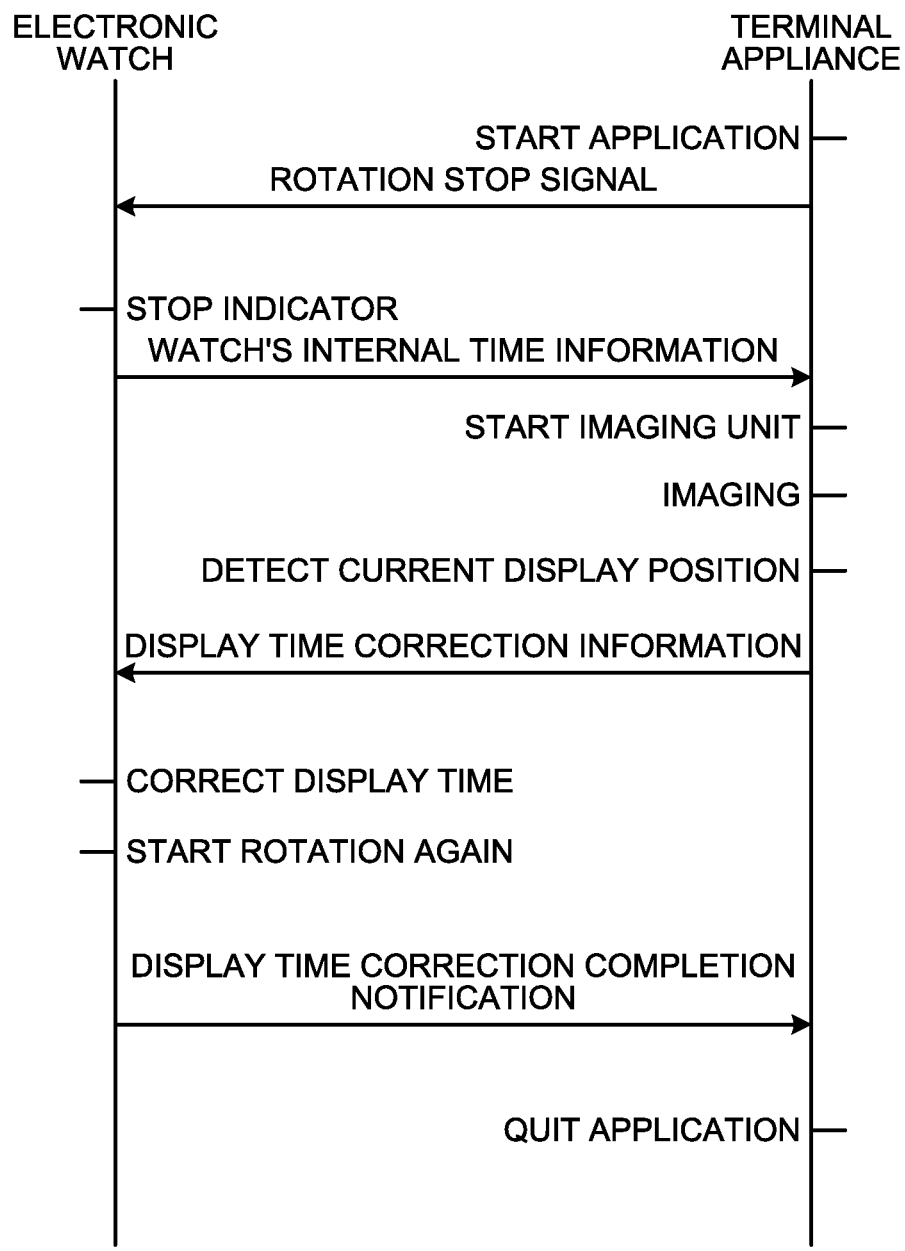
FIG. 5 is a sequence diagram of display time correction processing performed by the analog electronic watch system according to the embodiment.
Figure 6:
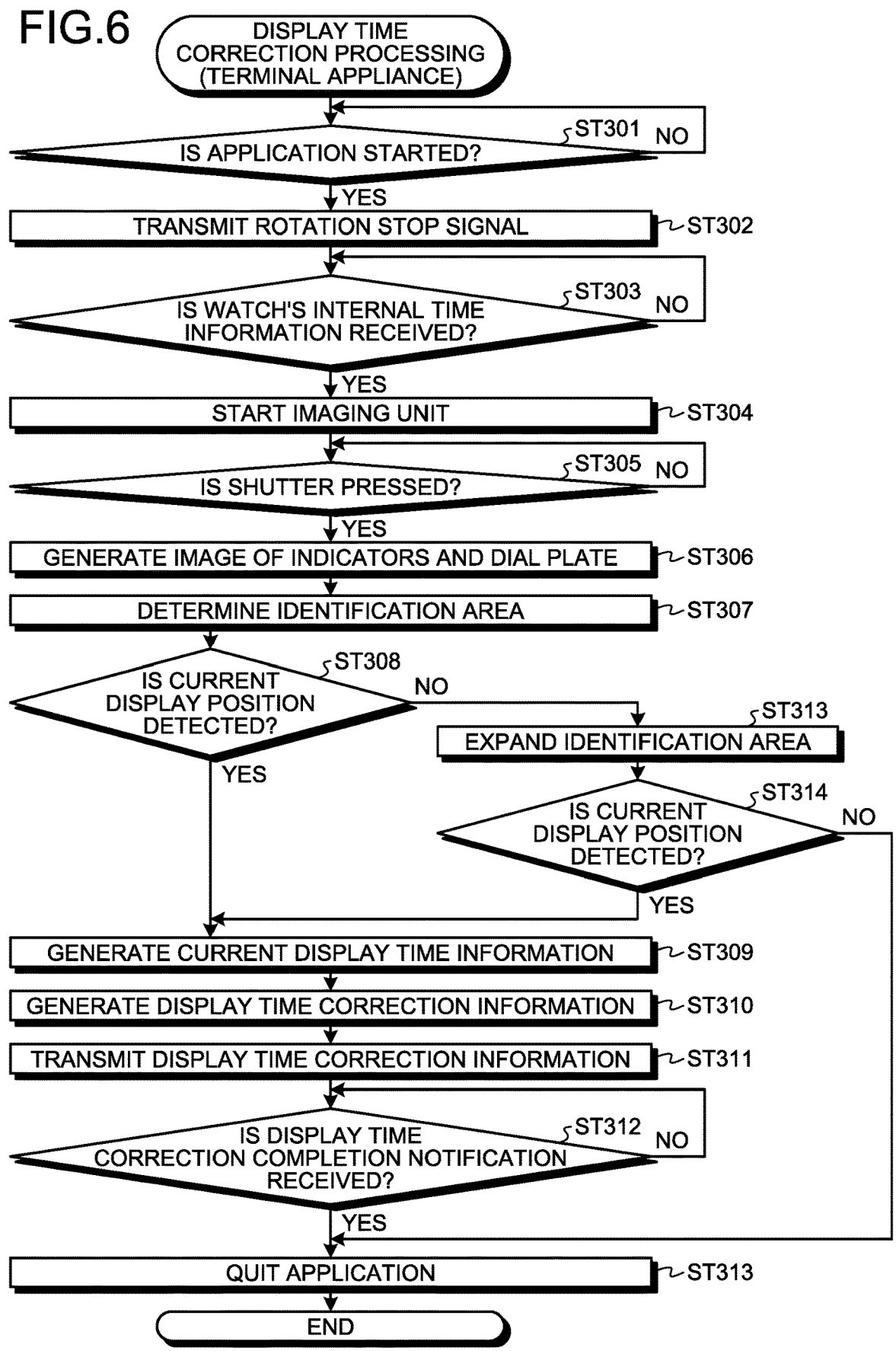
FIG. 6 is a flowchart of display time correction processing performed by the terminal appliance.
Figure 7:
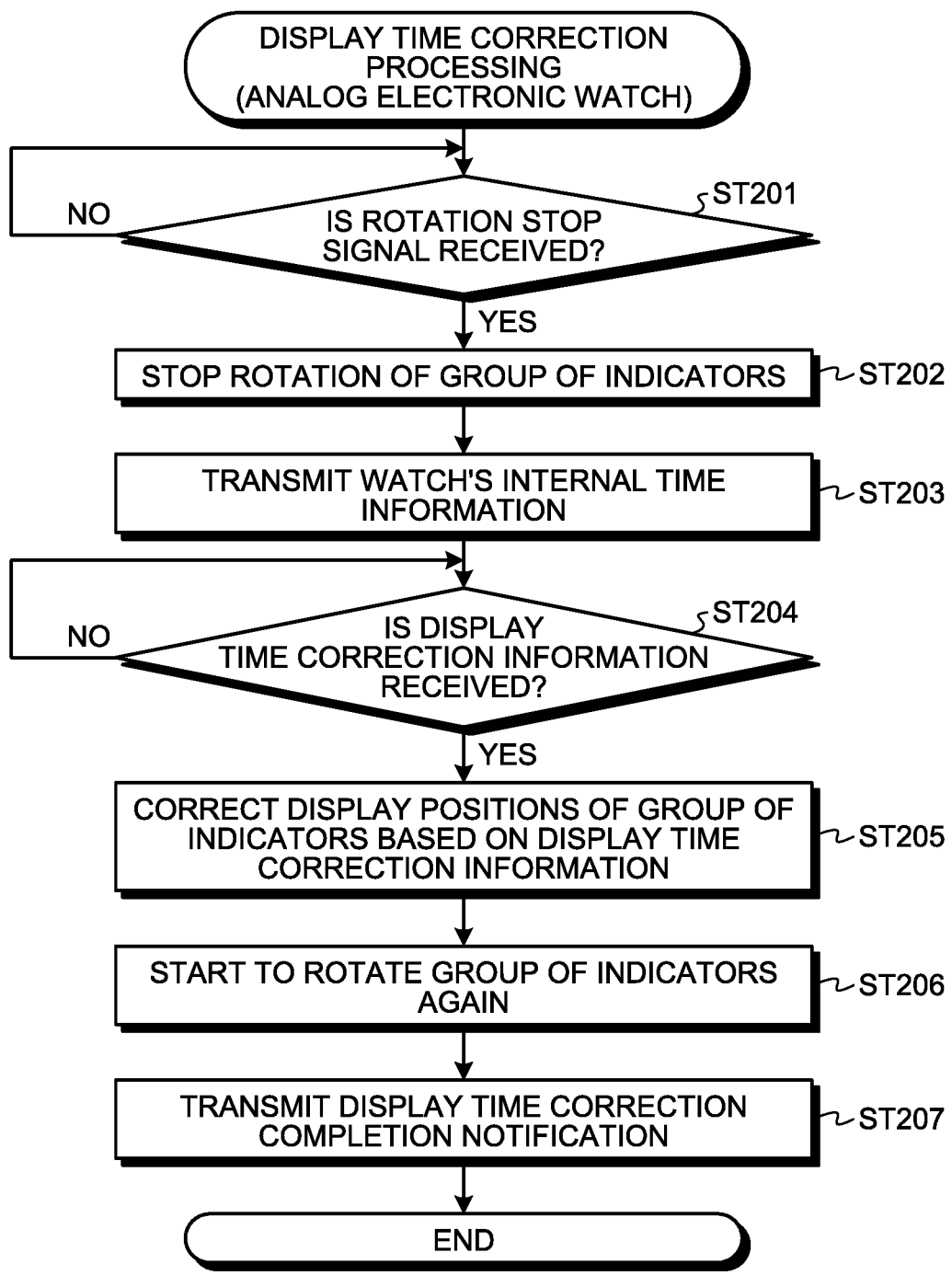
FIG. 7 is a flowchart of display time correction processing performed by the analog electronic watch.
Figure 8:
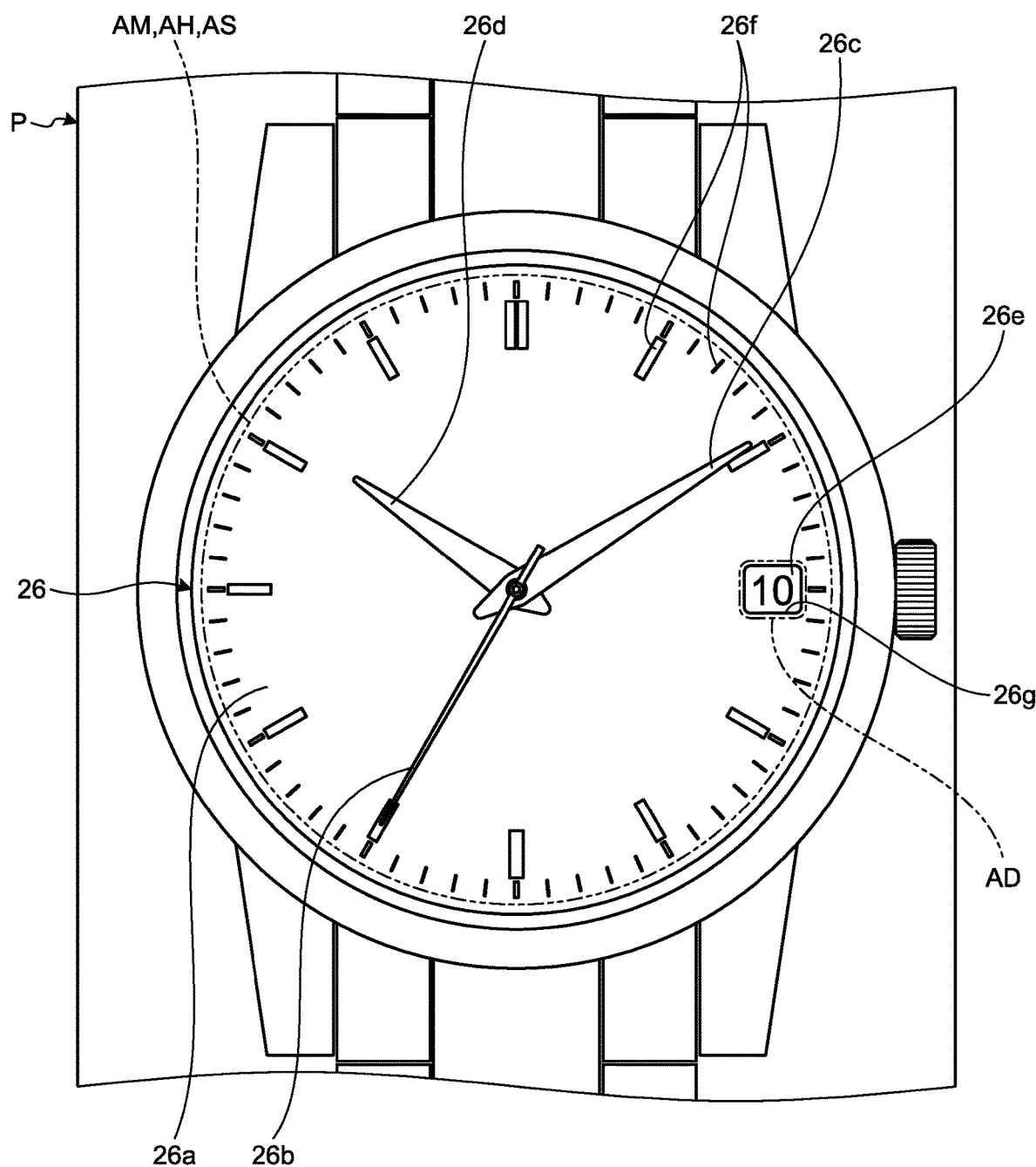
FIG. 8 is an explanatory diagram of the identification area (expanded) for the image of the indicators and the dial plate.

Next, the following describes display time correction performed by the analog electronic watch system 1 according to the present embodiment. FIG. 5 is a sequence diagram of display time correction processing performed by the analog electronic watch system according to the embodiment. FIG. 6 is a flowchart of display time correction processing performed by the terminal appliance. FIG. 7 is a flowchart of display time correction processing performed by the analog electronic watch. FIG. 8 is an explanatory diagram of the identification area (expanded) for the image of the indicators and the dial plate. The following describes a sequence of FIG. 5 in detail by using the flowcharts of FIG. 6 and FIG. 7.

First, as illustrated in FIG. 5, the user starts the display time correction application of the terminal appliance 3. In this case, to start the application, for example, the user presses an icon of a start button corresponding to the application displayed on the display surface 32a (performs an operation input on an icon display position of the start button on the display surface 32a). The communication unit 34 of the terminal appliance 3 according to the present embodiment establishes Bluetooth communication with the communication unit 22 of the analog electronic watch 2 when the application is started.

Next, as illustrated in FIG. 6, the controller 35 of the terminal appliance 3 determines whether the application is started (Step ST301).

Next, if it is determined that the application is started (Yes at Step ST301), the controller 35 transmits a rotation stop signal to the analog electronic watch 2 (Step ST302). At this point, the group of indicators 26b to 26e of the analog electronic watch 2 are in a rotating state, so that the controller 35 outputs, to the controller 23, the rotation stop signal for stopping the rotation of the group of indicators 26b to 26e via the communication units 34 and 22 so that the imaging unit 31 can perform imaging in a state in which the group of indicators 26b to 26e are stopped. If it is determined that the application is not started (No at Step ST301), the controller 35 repeats Step ST301 until the application is started.

Next, as illustrated in FIG. 7, the controller 23 of the analog electronic watch 2 determines whether the rotation stop signal is received (Step ST201).

Next, if it is determined that the rotation stop signal is received (Yes at Step ST201), the controller 23 stops the rotation of the group of indicators 26b to 26e (Step ST202). In this case, the controller 23 causes the motor drive circuit 23b to stop outputting the drive signal to the driving mechanism unit 25. Due to this, in the analog electronic watch 2, the group of indicators 26b to 26e stop at the current display positions. The controller 23 prohibits counting performed by the counter, and stops updating the watch's internal time information, that is, stops counting the watch's internal time. If it is determined that the rotation stop signal is not received (No at Step ST201), the controller 23 repeats Step ST201 until the rotation stop signal is received.

Next, the controller 23 transmits the watch's internal time information to the terminal appliance 3 (Step ST203). At this point, the group of indicators 26b to 26e are in the rotation stopped state, so that the controller 23 outputs the watch's internal time information to the controller 35 via the communication units 22 and 34 to compare, by the terminal appliance 3, the current display positions with expected display positions of the group of indicators 26b to 26e based on the watch's internal time information at the time when the rotation of the group of indicators 26b to 26e is stopped.

Next, as illustrated in FIG. 6, the controller 35 determines whether the watch's internal time information is received (Step ST303).

Next, if it is determined that the watch's internal time information is received (Yes at Step ST303), the controller 35 starts the imaging unit 31 (Step ST304). In this case, the controller 35 acquires the watch's internal time information, and starts the imaging unit 31 for imaging the analog display unit 26 including the group of indicators 26b to 26e in the rotation stopped state. When the imaging unit 31 is started, the controller 35 displays, on the display surface 32a, an image based on the image signal that is output from the imaging unit 31 in real time. That is, by visually recognizing the display surface 32a, the user can recognize a subject to be imaged by the imaging unit 31, that is, the analog display unit 26. The controller 35 also displays, as an icon, a shutter for instructing the imaging unit 31 to perform imaging. If it is determined that the watch's internal time information is not received (No at Step ST303), the controller 35 repeats Step ST303 until the watch's internal time information is received. In a case in which the watch's internal time information has not been received for a certain period of time, the controller 35 may quit the application (described later) after displaying, on the display surface 32a, an attention display image for causing the user to recognize that communication with the analog electronic watch 2 is not performed (Step ST313). In a case in which communication with the analog electronic watch 2 is not performed, it is assumed that communication with the analog electronic watch 2 cannot be established, or rotation of the group of indicators 26b to 26e is stopped due to reduction in battery capacity of the analog electronic watch 2, so that the controller 35 may display, on the display surface 32a, the fact that communication with the analog electronic watch 2 is not performed, and an attention display image for prompting the user to establish communication with the analog electronic watch 2 or to charge the analog electronic watch 2.

Next, the controller 35 determines whether the shutter is pressed (Step ST305).

Next, if it is determined that the shutter is pressed (Yes at Step ST305), the controller 35 generates the image P of the indicators and the dial plate (Step ST306). In this case, when the icon of the shutter displayed on the display surface 32a is pressed by the user, the controller 35 outputs, to the imaging unit 31, an imaging instruction signal for instructing the imaging unit 31 to perform imaging, the imaging unit 31 performs imaging, and the image P of the indicators and the dial plate is generated. If it is determined that the shutter is not pressed (No at Step ST305), the controller 35 repeats Step ST305 until the shutter is pressed.

Next, the controller 35 determines identification areas AS, AM, AH, and AD (hereinafter, simply referred to as "AS to AD" in some cases) (Step ST307). In this case, as illustrated in FIG. 4, the controller 35 determines the identification area AS corresponding to the second hand 26b, the identification area AM corresponding to the minute hand 26c, the identification area AH corresponding to the hour hand 26d, and the identification area AD corresponding to the date plate 26e. The identification areas AS to AD are part of the image P of the indicators and the dial plate. The identification areas AS, AM, and AH are normal identification areas that are determined under the condition that the identification areas include the indexes 26f and expected display positions of the second hand 26b, the minute hand 26c, and the hour hand 26d with respect to the dial plate 26a based on the watch's internal time information. The identification areas AS, AM, and AH according to the present embodiment each have a fan shape having the same central angle (expected display time±30 degrees) with respect to the center of the dial plate 26a in the image P of the indicators and the dial plate, and are formed so that outer end parts thereof in the radial direction in rotation are positioned on an outer side of the indexes 26f in the radial direction in rotation. In this case, the position of the date window 26g with respect to the dial plate 26a is not changed unlike the three hands 26b to 26d, and has only several variations even when a model of the analog electronic watch 2 is different. Thus, the controller 35 sets several types of positions of the date window 26g with respect to the dial plate 26a in advance, and determines the identification area AD from the several types of positions.

Next, the controller 35 determines whether the current display positions of the group of indicators 26b to 26e are detected (Step ST308). In this case, the controller 35 detects the second hand 26b, the minute hand 26c, the hour hand 26d, and the date plate 26e (the identification pattern of the date plate 26e) in the respective identification areas AS to AD, and detects the current display positions with respect to the dial plate 26a. The controller 35 according to the present embodiment performs pattern matching processing on images of each of the identification areas AS to AD in the image P of the indicators and the dial plate to detect the group of indicators 26b to 26e and the indexes 26f. The pattern matching processing is processing of comparing values such as luminance, saturation, brightness, and a hue of each pixel in the respective identification areas AS to AD to extract geometric shape information, in the present embodiment, a long and narrow shape and the identification pattern, for example.

Next, if it is determined that the current display positions of the group of indicators 26b to 26e are detected (Yes at Step ST308), the controller 35 generates current display time information (Step ST309). In this case, the controller 35 determines a "second", a "minute", and an "hour" of the current display time based on relative positions of the detected three hands 26b to 26d and indexes 26f. The positions of the respective identification areas AS, AM, and AH (hereinafter, simply referred to as "AS to AH" in some cases) with respect to the dial plate 26a are recognized by the controller 35 at the time when the controller 35 determines the identification areas AS to AH. Thus, the controller 35 can grasp which index 26f on the dial plate 26a correspond to the index 26f detected in each of the identification areas AS to AH. That is, the controller 35 can recognize the relative positions of the detected three hands 26b to 26d and indexes 26f, and can also recognize the display positions of the three hands 26b to 26d. Based on the display positions of the three hands 26b to 26d, the controller 35 determines a "second", a "minute", and an "hour" of the current display time. On the other hand, the controller 35 determines a "date" of the current display time based on the detected identification pattern of the date plate 26e. In this case, the controller 35 has acquired the watch's internal time information, so that the controller 35 can detect the current display position of the date plate 26e based on an estimated identification pattern of the date plate 26e exposed through the date window 26g.

Next, the controller 35 generates display time correction information (Step ST310). In this case, the controller 35 generates display time correction information based on a difference between the current display time information and the watch's internal time information acquired from the analog electronic watch 2. The controller 35 according to the present embodiment calculates, as the display time correction information, second difference information about the "second", minute/hour difference information about the "minute/hour", and date difference information about the "date" as the difference between the watch's internal time and the current display time.

Next, the controller 35 transmits the display time correction information to the analog electronic watch (Step ST311). At this point, the group of indicators 26b to 26e of the analog electronic watch 2 is in the rotation stopped state, so that the controller 35 outputs, to the controller 23, the display time correction information for correcting the display positions of the group of indicators 26b to 26e via the communication units 34 and 22 so that the group of indicators 26b to 26e can be rotated by the driving mechanism unit 25 in a state in which counting of the watch's internal time is stopped.

Next, as illustrated in FIG. 7, the controller 23 determines whether the display time correction information is received (Step ST204).

Next, if it is determined that the display time correction information is received (Yes at Step ST204), the controller 23 corrects the display positions of the group of indicators 26*b* to 26*e* based on the display time correction information (Step ST205). In this case, in the controller 23, the motor drive circuit 23*b* outputs drive signals to the respective step motors 25*a* to 25*c* of the driving mechanism unit 25 based on the display time correction information, that is, the second difference information about the "second", the minute/hour difference information about the "minute/hour", and the date difference information about the "date" instead of the watch's internal time. Thus, the group of indicators 26*b* to 26*e* each rotate from the current display positions to corrected display positions based on the display time correction information. The current position information is changed from positional information about the current display position to positional information corresponding to the corrected display position, and stored in the RAM 23*f*. If it is determined that the display time correction information is not received (No at Step ST204), the controller 23 repeats Step ST204 until the display time correction information is received.

Next, the controller 23 starts to rotate the group of indicators 26*b* to 26*e* again (Step ST206). In this case, the controller 23 starts to count the watch's internal time again, and starts to rotate the group of indicators 26*b* to 26*e* again via the motor drive circuit 23*b* and the driving mechanism unit 25 based on the watch's internal time.

Next, the controller 23 transmits a display time correction completion notification to the terminal appliance 3 (Step ST207). At this point, display time correction of the analog electronic watch 2 is completed, and the group of indicators 26*b* to 26*e* are in a rotation restarted state, so that the controller 23 outputs, to the controller 35, the display time correction completion notification to be a trigger for quitting the application via the communication units 22 and 34 so that the application can be quit.

Next, as illustrated in FIG. 6, the controller 35 determines whether the display time correction completion notification is received (Step ST312).

Next, if it is determined that the display time correction completion notification is received (Yes at Step ST312), the controller 35 quits the application (Step ST313). In this case, when receiving the display time correction completion notification, the controller 35 quits the application after displaying, on the display surface 32*a*, an attention attracting display for causing the user to recognize the fact that display time correction is completed, for example. If it is determined that the display time correction completion notification is not received (No at Step ST312), the controller 35 repeats Step ST312 until the display time correction completion notification is received.

If it is determined that the current display positions of the group of indicators 26*b* to 26*e* cannot be detected (No at Step ST308), the controller 35 expands the identification area (Step ST313). If it is determined that the current display positions of the three hands 26*b* to 26*d* cannot be detected in the respective identification areas AS, AM, and AH, the controller 35 according to the present embodiment causes an image corresponding to the dial plate 26*a* in the image P of the indicators and the dial plate to be the identification areas AS, AM, and AH as illustrated in FIG. 8. Alternatively, if it is determined that the current display positions of the three hands 26*b* to 26*d* cannot be detected in the respective identification areas AS, AM, and AH, the controller 35 may gradually increase the lengths of the respective identification areas AS, AM, and AH in the radial direction in rotation and the lengths thereof in the rotation direction, and may cause the entire image P of the indicators and the dial plate to be the identification areas AS, AM, and AH in the end.

Next, the controller 35 determines whether the current display positions of the group of indicators 26*b* to 26*e* are detected (Step ST314). The controller 35 according to the present embodiment detects the second hand 26*b*, the minute hand 26*c*, the hour hand 26*d*, and the date plate 26*e* in the expanded identification areas AS to AH and the identification area AD, and detects the current display positions thereof with respect to the dial plate 26*a*. If it is determined that the current display positions of the group of indicators 26*b* to 26*e* are detected (Yes at Step ST314), the controller 35 performs Step ST309 to Step ST313. On the other hand, if it is determined that the current display positions of the group of indicators 26*b* to 26*e* cannot be detected (No at Step ST314), the controller 35 causes the display surface 32*a* to display an attention attracting indication for causing the user to recognize the fact that the current display positions cannot be recognized, for example, and quits the application (Step ST313).

As described above, the analog electronic watch system 1 according to the present embodiment stops the rotation of the group of rotating indicators 26*b* to 26*e*, generates the display time correction information based on the watch's internal time information and the current display time information based on the current display positions, corrects the group of indicators 26*b* to 26*e* based on the display time correction information in a state in which the rotation of the group of indicators 26*b* to 26*e* is stopped, and starts to rotate the group of indicators 26*b* to 26*e* again. Typically, in display time correction performed by the user, the watch's internal time is not so much shifted from the current display time in many cases, and rotation amounts of the group of indicators 26*b* to 26*e* are small in correcting the group of indicators 26*b* to 26*e* in display time correction. Thus, a time for rotating the group of indicators 26*b* to 26*e* from the current display positions to the corrected display positions based on the display time correction information is shorter than a time required for other operations and processing in display time correction, so that it is effective to shorten the time required for other operations and processing in the display time correction for reducing the time required for display time correction. The analog electronic watch system 1 does not rotate the group of indicators 26*b* to 26*e* from the current display positions to the reference positions to generate the image P of the indicators and the dial plate. That is, display time correction can reduce the time from when display time correction is started until the analog display unit 26 is imaged by the imaging unit 31. After the image P of the indicators and the dial plate is generated, display time correction only requires an image processing time for detecting the current display positions of the group of indicators 26*b* to 26*e* and the time for rotating the group of indicators 26*b* to 26*e* from the current display positions to the corrected display positions based on the display time correction information, and the group of indicators 26*b* to 26*e* can be started to rotate again based on the watch's internal time. Due to this, the analog electronic watch system 1 can perform display time correction without rotating the group of indicators 26*b* to 26*e* based on the reference position information, so that the time required for display time correction can be reduced.

In detecting the current display positions of the group of indicators 26*b* to 26*e* with the analog electronic watch system 1, the entire image P of the indicators and the dial plate is not caused to be a detection target of the group of indicators 26b to 26e, and the identification areas AS to AD as part of the image P of the indicators and the dial plate are caused to be detection targets, so that the number of pixels to be detection targets can be reduced. Thus, with the analog electronic watch system 1, the image processing time for detecting the current display positions of the group of indicators 26b to 26e can be reduced, so that the time required for display time correction can be reduced. Additionally, the analog electronic watch system 1 causes the identification areas AS to AD as part of the image P of the indicators and the dial plate to be the detection targets, so that noise such as a design or a logotype on the dial plate 26a can be suppressed, erroneous detection and the like can be prevented, and detection accuracy can be improved as compared with a case in which the entire image P of the indicators and the dial plate is caused to be the detection target.

The shift between the watch's internal time and the current display time is a shift between the display positions based on the watch's internal time and the current display positions, that is, a shift between the reference positions and actual reference positions at the time when the group of indicators 26b to 26e rotate to the actual reference positions based on the current position information and the reference position information. That is, the analog electronic watch system 1 can also correct the reference positions based on the display time correction information based on the difference between the watch's internal time and the current display time. In this case, the analog electronic watch system 1 corrects, that is, updates the reference position information stored in the nonvolatile memory 23c based on the display time correction information. Thus, the analog electronic watch system 1 can correct the reference position information in accordance with display time correction without rotating the group of indicators 26b to 26e to the reference positions.

If it is determined that the current display positions of the three hands 26b to 26d cannot be detected in the respective normal identification areas AS, AM, and AH, the analog electronic watch system 1 detects the current display positions of the three hands 26b to 26d in the respective expanded identification areas AS to AH including the dial plate 26a in the image P of the indicators and the dial plate. Thus, in a case in which the shift amounts of the three hands 26b to 26d are large, and there are no images corresponding to the three hands 26b to 26d in the respective normal identification areas AS, AM, and AH, for example, the analog electronic watch system 1 causes an image larger than the image corresponding to the dial plate 26a in the image P of the indicators and the dial plate to be each of the identification areas AS to AH, so that the three hands 26b to 26d can be detected. Due to this, the analog electronic watch system 1 can securely detect the group of indicators 26b to 26e, and can securely perform display time correction with the image P of the indicators and the dial plate.

Modification

Figure 9:
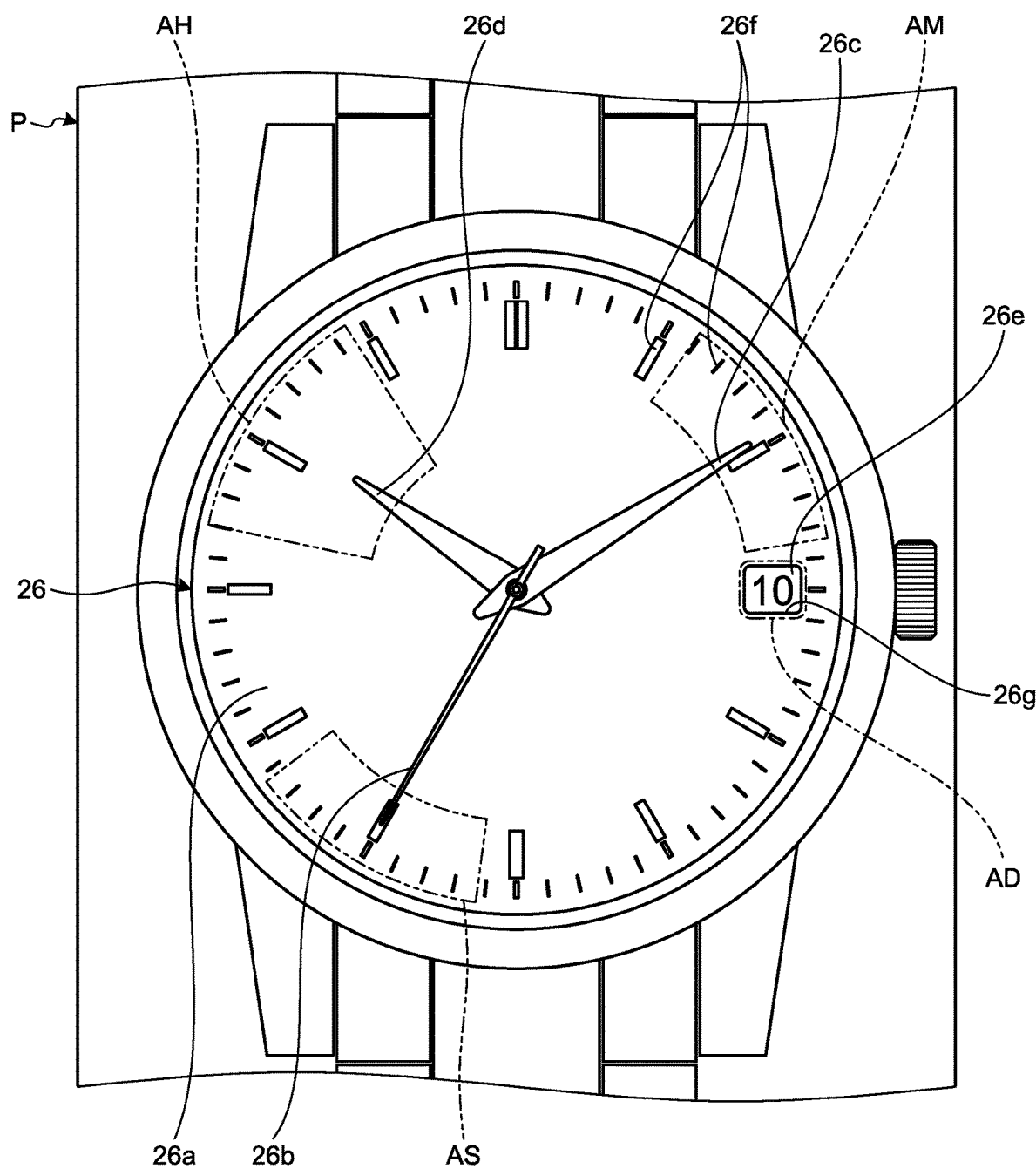
FIG. 9 is an explanatory diagram of the identification areas for the image of the indicators and the dial plate according to a modification.
Figure 10:
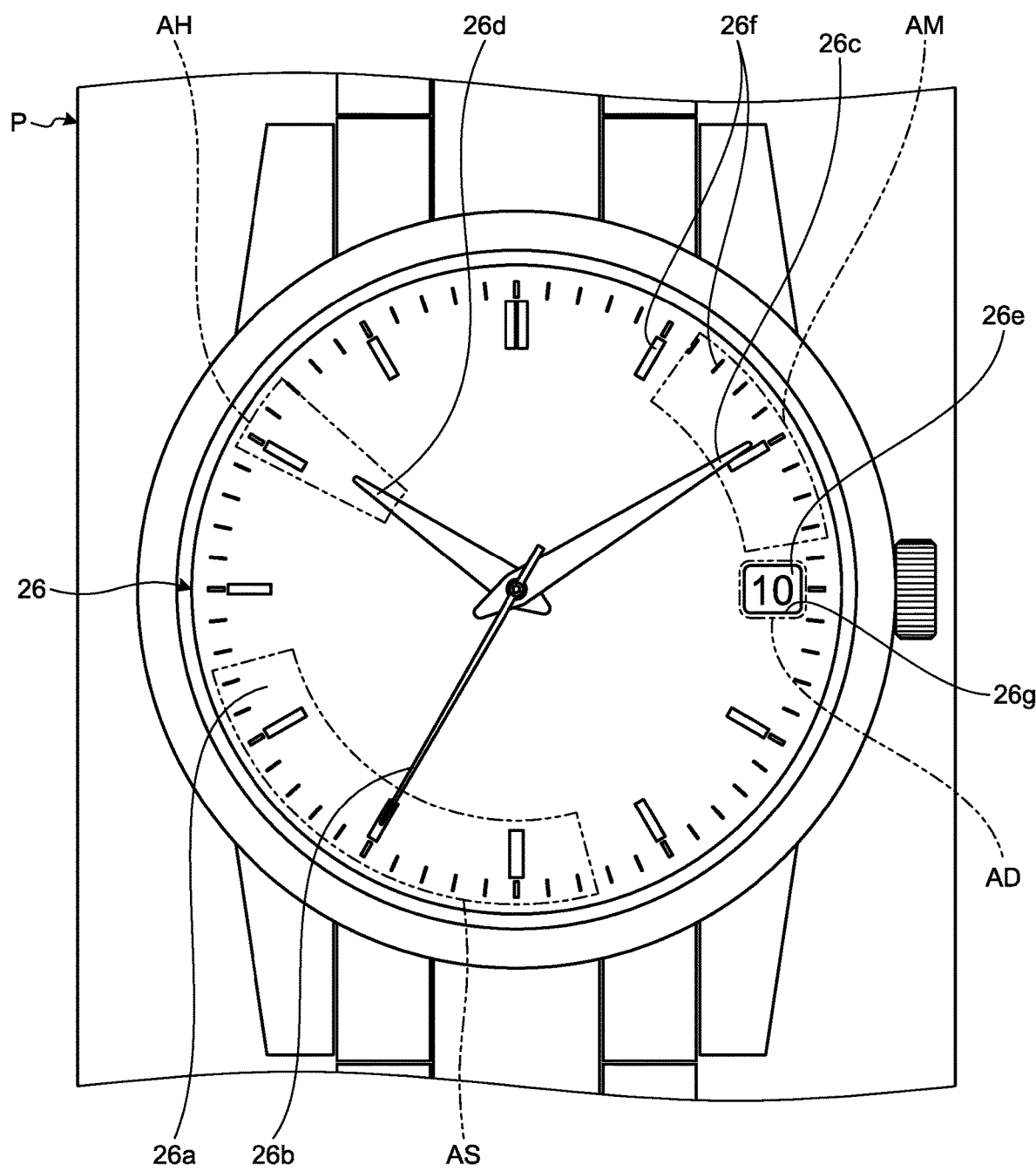
FIG. 10 is an explanatory diagram of the identification areas for the image of the indicators and the dial plate according to the modification.

In the analog electronic watch system 1 according to the embodiment described above, the normal identification areas AS, AM, and AH are assumed to have the same shape, but the embodiment is not limited thereto. FIG. 9 is an explanatory diagram of the identification areas for the image of the indicators and the dial plate according to a modification. FIG. 10 is an explanatory diagram of the identification areas for the image of the indicators and the dial plate according to the modification. In determining each of the identification areas AS, AM, and AH, the controller 35 may vary area lengths of the identification areas in the radial direction in rotation corresponding to the lengths of the respective three hands 26b to 26d in the radial direction in rotation. In this case, the controller 35 detects the three hands 26b to 26d in the respective identification areas AS, AM, and AH based on the relative positions of the three hands 26b to 26d and the indexes 26f. Thus, in the detection, it is sufficient that each of the identification areas AS, AM, and AH includes an image corresponding to the indexes 26f and an image corresponding to part of the respective three hands 26b to 26d on an outer side in the radial direction in rotation. That is, regarding one of the three hands 26b to 26d having a distal end part closer to the indexes 26f as an end part on the outer side in the radial direction in rotation, the area length thereof in the radial direction in rotation can be shortened as compared with one of the three hands 26b to 26d having a distal end part distant from the indexes 26f. Thus, as illustrated in FIG. 9, among the three hands 26b to 26d, the controller 35 determines the identification area AH corresponding to an indicator the relative position of which is more distant from the indexes 26f than the others of the three hands 26b to 26d, that is, the hour hand 26d according to the present embodiment, to be larger than the identification areas AS and AM corresponding to the second hand 26b and the minute hand 26c in the radial direction in rotation. Due to this, by varying the lengths of the respective identification areas AS to AH in the radial direction in rotation, the number of pixels as detection targets can be reduced in the identification areas AS to AH. Thus, the analog electronic watch system 1 can reduce the image processing time for detecting the current display positions of the group of indicators 26b to 26e, so that the time required for display time correction can be further reduced.

In determining the identification areas AS, AM, and AH, the controller 35 may vary the area length of the identification area in the rotation direction in accordance with the rotation amount of each of the three hands 26b to 26d per one time. In this case, the rotation amount per one time is different among the three hands 26b to 26d, and the rotation amount per one time is reduced in order of the second hand 26b, the minute hand 26c, and the hour hand 26d. The shift between the watch's internal time and the current display time tends to be increased as the rotation amount per one time increases, so that the shift between the display position based on the watch's internal time and the current display position may be increased in order of the hour hand 26d, the minute hand 26c, and the second hand 26b with high possibility. Thus, in the detection, the detection target in the rotation direction may be varied in each of the identification areas AS, AM, and AH based on the rotation amount of each of the three hands 26b to 26d per one time. That is, the length of one of the three hands 26b to 26d the rotation amount of which per one time is small may be shortened in the rotation direction as compared with the other one of the three hands 26b to 26d the rotation amount of which per one time is large. Thus, as illustrated in FIG. 10, the controller 35 determines the identification area AM corresponding to the indicator among the three hands 26b to 26d the rotation amount of which per one time is smaller than that of the others of the three hands 26b to 26d, that is, the minute hand 26c in the present embodiment, to be smaller than the identification area AS corresponding to the second hand 26b, and determines the identification area AH corresponding to the hour hand 26d to be smaller than the identification area AM corresponding to the minute hand 26c, in the rotation direction. Due to this, by varying the lengths of the respective identification areas AS to AH in the rotation direction, the number of pixels as detection targets can be reduced in the respective identification areas AS to AH. Accordingly, the analog electronic watch system 1 can reduce the image processing time for detecting the current display positions of the group of indicators 26b to 26e, so that the time required for display time correction can be further reduced.

Figure 11:
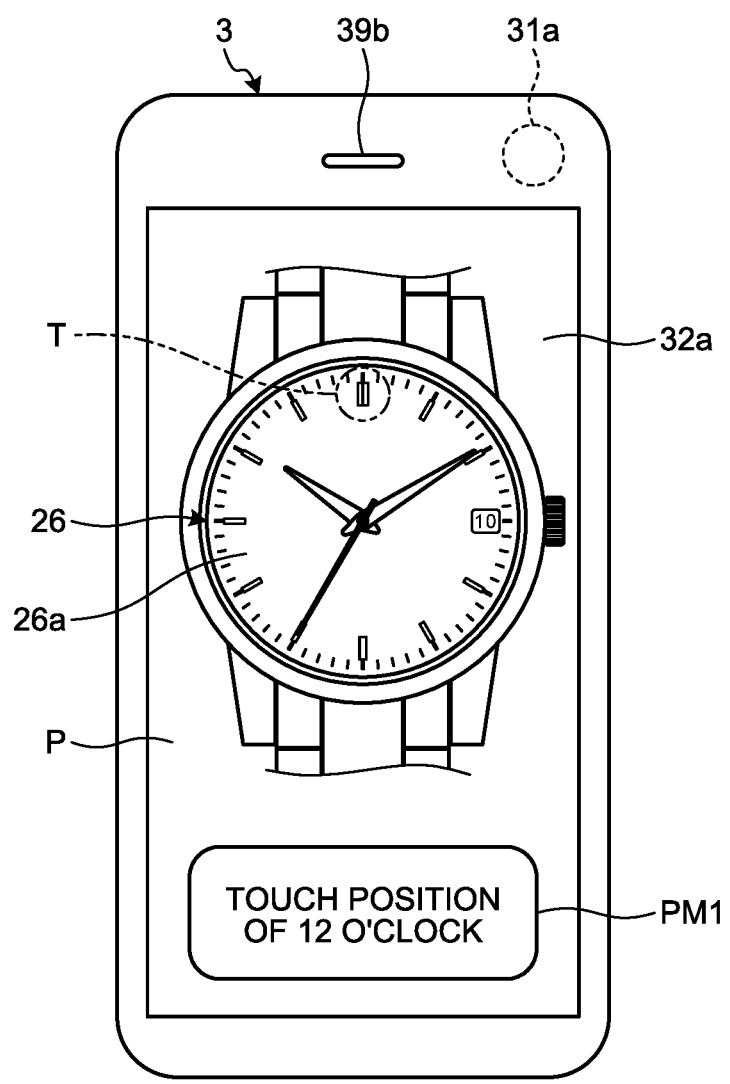
FIG. 11 is a diagram illustrating a display example of an attention display image on a display surface of the terminal appliance according to the modification.
Figure 12:
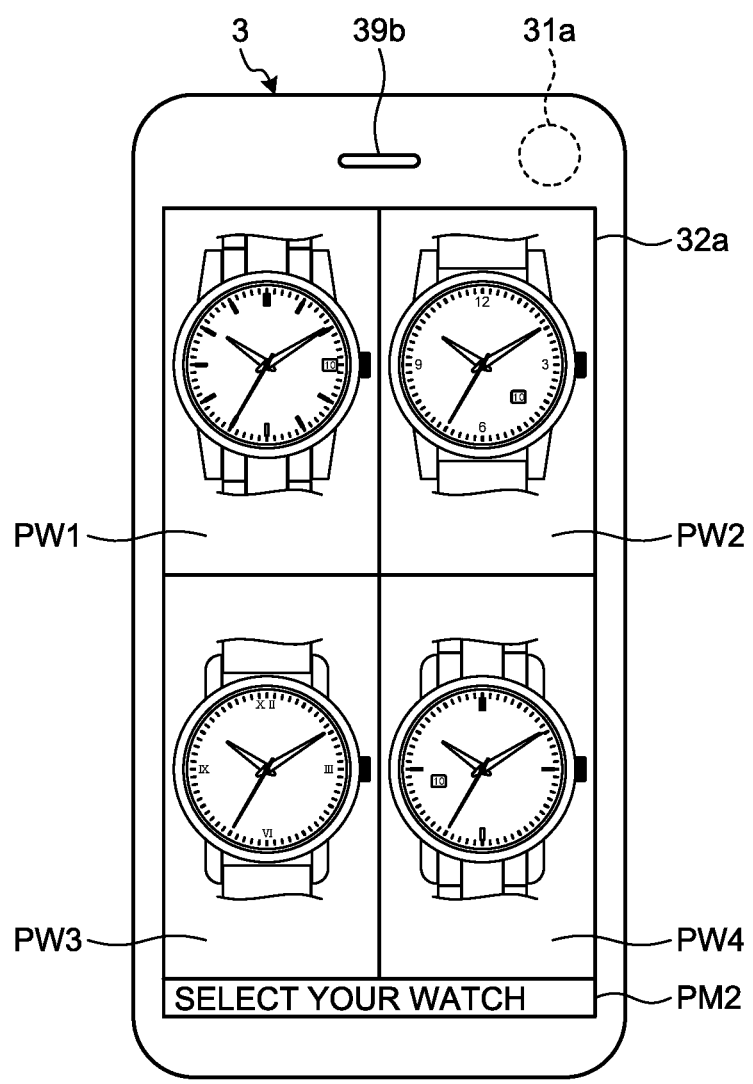
FIG. 12 is a diagram illustrating a display example of an attention display image on the display surface of the terminal appliance according to the modification.

The analog electronic watch system 1 according to the embodiment described above may cause the user to perform an operation for improving detection accuracy for the current display positions of the group of indicators 26b to 26e before the controller 35 detects the current display positions of the group of indicators 26b to 26e. FIG. 11 is a diagram illustrating a display example of an attention display image on the display surface of the terminal appliance according to the modification. FIG. 12 is a diagram illustrating a display example of an attention display image on the display surface of the terminal appliance according to the modification.

For example, before determining the identification areas AS to AD, as illustrated in FIG. 11, the controller 35 may display the image P of the indicators and the dial plate on the display surface 32a, and display an attention display image PM1 for prompting the user to perform an operation input on an index position T corresponding to 12 o'clock on the dial plate 26a. In the modification, after generating the image P of the indicators and the dial plate and before determining the identification areas AS to AD, the controller 35 displays the image P of the indicators and the dial plate and the attention display image PM1 on the display surface 32a at the same time. The attention display image PM1 displays, for example, "Touch position of 12 o'clock". The controller 35 determines whether the index position T corresponding to 12 o'clock on the dial plate 26a is pressed by the user. If it is determined that the index position T is pressed, that is, the operation input is performed, the controller 35 determines the identification areas AS, AM, AH, and AD based on the watch's internal time information and the operation input position information for the image P of the indicators and the dial plate. Thus, before determining the identification areas AS to AD, the controller 35 can determine a state of the image corresponding to the dial plate 26a in the image P of the indicators and the dial plate, for example, a vertical direction and a rotation angle, based on the index position T corresponding to 12 o'clock. Due to this, the controller 35 can grasp a relative positional relation between the analog display unit 26 and the imaging unit 31 before determining the identification areas AS to AD, so that the time required for determining the identification areas AS to AD can be shortened, and the time required for display time correction can be further reduced. At the same time as when the controller 35 displays the attention display image PM1 on the display surface 32a, or at a different time, the controller 35 may prompt the user to perform an operation input on the index position T corresponding to 12 o'clock on the dial plate 26a using a notification unit for the user such as voice.

For example, before recognizing the current display positions of the group of indicators 26b to 26e, as illustrated in FIG. 12, the controller 35 may display a plurality of analog electronic watch identification images PW1 to PW4 on the display surface 32a, and may display an attention display image PM2 for prompting the user to perform an operation input for selecting one of the analog electronic watch identification images PW1 to PW4. In the modification, after determining that the application is started and before the imaging unit 31 is started, the controller 35 displays the analog electronic watch identification images PW1 to PW4 and the attention display image PM2 on the display surface 32a at the same time. The analog electronic watch identification images PW1 to PW4 are stored in the storage unit 37 in advance, and associated with information about the indicators and the dial plate including shape information about the group of indicators and the dial plate, which is different depending on a model, for each analog electronic watch. The analog electronic watch identification images PW1 to PW4 according to the modification are images each including the dial plate of the analog electronic watch. The information about the indicators and the dial plate according to the modification can be used in detecting the current display positions of the group of indicators 26b to 26e by the controller 35, and are outline images of the group of indicators 26b to 26e, the dial plate 26a, and the indexes 26f. In the pattern matching processing, geometric shape information is extracted based on the outline images. The attention display image PM2 displays, for example, "Select your watch". The controller 35 determines whether any of the analog electronic watch identification images PW1 to PW4 is pressed by the user. If it is determined that any of the analog electronic watch identification images PW1 to PW4 is pressed, that is, determined that an operation input is performed, the controller 35 displays the information about the indicators and the dial plate related to the selected one of the analog electronic watch identification images PW1 to PW4 corresponding to the operation input position by being superimposed on the analog display unit 26 being imaged in real time on the display surface 32a at the time of imaging the analog display unit 26 by the imaging unit 31. For example, an outline image of the dial plate 26a and the indexes 26f in the selected one of the analog electronic watch identification images PW1 to PW4 is displayed in a translucent state on the display surface 32a. Thus, at the time of imaging the analog display unit 26 with the imaging unit 31, the user can image the analog display unit 26 in a state of combining the displayed outline image of the group of indicators and the dial plate with the group of indicators 26b to 26e, the dial plate 26a, and the indexes 26f of the analog display unit 26. Due to this, before determining the identification areas AS to AD, the controller 35 can determine a state of the image corresponding to the dial plate 26a in the image P of the indicators and the dial plate, for example, a vertical direction and a rotation angle. The controller 35 also determines the identification areas AS, AM, AH, and AD based on the watch's internal time information and the shape information related to the selected one of the analog electronic watch identification images PW1 to PW4. That is, the controller 35 can grasp the relative positional relation between the analog display unit 26 and the imaging unit 31 before determining the identification areas AS to AD, and can shorten the time required for determining the identification areas AS to AD, so that the time required for display time correction can be further reduced. Additionally, the controller 35 detects the current display positions of the group of indicators 26b to 26e in the identification areas AS, AM, AH, and AD based on the information about the indicators and the dial plate related to the selected one of the analog electronic watch identification images PW1 to PW4 corresponding to the operation input position among the analog electronic watch identification images PW1 to PW4. Due to this, the controller 35 can perform image processing using the information about the indicators and the dial plate in detecting the current display positions of the group of indicators 26b to 26e, so that the detection time for the current display positions of the group of indicators 26b to 26e can be shortened, and the time required for display time correction can be further reduced. The information about the indicators and the dial plate may include not only the shape information but also other information. For example, the information about the indicators and the dial plate may include color information such as colors of the group of indicators 26b to 26e, the dial plate 26a, and the indexes 26f. When the color information is included therein, the geometric shape information can be easily extracted from the information about a color of each pixel in the respective identification areas AS to AD. At the same time as when the controller 35 displays the attention display image PM2 on the display surface 32a, or at a different time, the controller 35 may prompt the user to perform an operation input for selecting one of the analog electronic watch identification images PW1 to PW4 using a notification unit for the user such as voice.

The analog electronic watch system 1 according to the modification may acquire the information about the indicators and the dial plate for each analog electronic watch from an external appliance in advance. In this case, it is preferable that the controller 35 acquire the information about the indicators and the dial plate corresponding to the analog electronic watch 2 held by the user. For example, at the time of installing the application for the first time or updating the application, the controller 35 displays, on the display surface 32a, an attention display image for prompting the user to input a caliber number indicating a product number of a movement of the analog electronic watch 2 based on an operation on the touch panel unit 32, or based on the voice through the microphone 39a, and requests one or more pieces of the information about the indicators and the dial plate corresponding to the caliber number input by the user from an external server that stores therein the information about the indicators and the dial plate of commercialized analog electronic watches in advance. The controller 35 stores, in the storage unit 37, the one or more pieces of the information about the indicators and the dial plate acquired from the external server as needed. In a case in which the caliber number is unknown to the user, a package number may be used. Each package number corresponds to one type of analog electronic watch. Thus, in a case of acquiring the information about the indicators and the dial plate from the external server based on the package number, the controller 35 stores, in the storage unit 37, a piece of the information about the indicators and the dial plate corresponding to the one type of analog electronic watch. In a case in which various numbers corresponding to the analog electronic watch 2 held by the user are unknown, the information about the indicators and the dial plate is acquired from the external server based on attributes of the analog electronic watch 2 (a size of the dial plate 26a, a display mode of indexes and the like, a position of the date window 26g, and the like).

For example, in a case in which the image P of the indicators and the dial plate displayed on the display surface 32a is not matched with the indicators and the dial plate including the dial plate 26a and the group of indicators 26b to 26e of the analog electronic watch 2 held by the user, the display surface 32a displays an indication for prompting the user to select a size of the dial plate 26a, presence or absence of a small register, and a type of a character of "hour" on the dial plate 26a (bar indexes, Arabic numerals, or Roman numerals) in this order, and the information about the indicators and the dial plate corresponding to the analog electronic watch 2 held by the user is acquired.

In the analog electronic watch system 1 according to the embodiment and the modification described above (hereinafter, simply referred to as "embodiment and the like" in some cases), the watch's internal time of the analog electronic watch 2 may be corrected based on the terminal's internal time of the terminal appliance 3 at the time of display time correction processing.

The embodiment and the like describe a case of performing display time correction of the group of indicators 26b to 26e, but the embodiment is not limited thereto. Display time correction may be performed on some of the group of indicators 26b to 26e the current display positions of which may be largely shifted from the expected display positions of the group of indicators 26b to 26e based on the watch's internal time information, for example, only the second hand 26b and the minute hand 26c.

In the embodiment and the like described above, in a case in which the display positions of the three hands 26b to 26d are close to each other in the rotation stopped state, the lengths of some of the identification areas AS to AH may be shortened in the rotation direction, the identification areas AS to AH for the indicators that are close to each other among the three hands 26b to 26d. In this case, it is preferable to shorten the length in the rotation direction of the identification area corresponding to the indicator the rotation amount of which per one time is small rather than the identification area corresponding to the indicator the rotation amount of which per one time is large among the indicators being close to each other.

In the embodiment and the like described above, in a case in which the display positions of the three hands 26b to 26d are close to each other in the rotation stopped state, the indicators close to each other among the three hands 26b to 26d may be rotated to be separated from each other before display time correction is performed. In this case, after acquiring the watch's internal time, the controller 35 determines whether the display positions of the three hands 26b to 26d are close to each other, and if it is determined that the display positions are close to each other, the controller 35 outputs possible time information to the controller 23. In the controller 23, the motor drive circuit 23b outputs drive signals to the respective step motors 25a to 25c of the driving mechanism unit 25 based on the possible time information, and rotates the group of indicators 26b to 26e in the rotation stopped state to the display positions based on the possible time information. The controller 35 generates the display time correction information based on the possible time information and the current display time information. After the controller 23 corrects the display positions of the group of indicators 26b to 26e based on the display time correction information, the controller 35 rotates the group of indicators 26b to 26e to the display positions at which the rotation thereof has been stopped, and starts to rotate the group of indicators 26b to 26e again based on the watch's internal time information. Due to this, the controller 35 can securely detect the current display positions of the group of indicators 26b to 26e, so that display time correction can be securely performed.

The controller 35 according to the embodiment and the like described above quits the application in a case in which the current display positions of the group of three hands 26b to 26d cannot be detected, but the embodiment is not limited thereto. The controller 35 may rotate at least one of the three hands 26b to 26d, the user may perform imaging again with the imaging unit 31 to generate the image P of the indicators and the dial plate again, and display time correction may be performed based on the image P of the indicators and the dial plate. For example, the controller 35 may rotate the indicator the current display position of which cannot be detected among the three hands 26b to 26d, the user may perform imaging again with the imaging unit 31 to generate the image P of the indicators and the dial plate again, and display time correction may be performed on the indicator the current display position of which cannot be detected based on the image P of the indicators and the dial plate. That is, imaging of the analog electronic watch 2 may be successively performed by performing imaging again by the imaging unit 31, and display time correction may be performed based on a plurality of images P of the indicators and the dial plate that are chronologically successive. Specifically, movement amounts of the group of three hands 26b to 26d with a lapse of time are different from each other, so that the movement amount and the lapse of time may be obtained from a different portion between the successive images P of the indicators and the dial plate, and whether the movement amount is matched with the movement amount of each of the three hands 26b to 26d may be determined to detect the position of the indicator. Due to this, the three hands 26b to 26d can be easily discriminated from an unnecessary reflection in the display surface 32a or the character of "hour" on the dial plate 26a, classifications and the positions of the three hands 26b to 26d can be accurately detected, and the display time can be corrected. In this case, it is preferable that the controller 35 display, on the display surface 32a, an attention display image for prompting the user to immediately perform photographing again, or prompting the user to perform photographing again after a predetermined time has elapsed. A time interval is generated in photographing with the imaging unit 31, so that a photographing environment such as reflection caused by external light can be varied. Accordingly, erroneous detection and the like can be prevented, and detection accuracy can be improved. At the time of prompting the user to perform photographing again, the controller 35 may also display, on the display surface 32a, an attention display image for prompting the user to change the photographing environment at the same time.

At the time of rotating the indicators in a case in which the current display positions cannot be detected, detection of the three hands 26b to 26d can be facilitated by operating the three hands 26b to 26d to alternately repeat rotation in an advancing direction and a delaying direction, and successively performing imaging of the image P of the indicators and the dial plate at the same time. When detection of the three hands 26b to 26d is unsuccessful, the rotation amount in the advancing direction and the delaying direction may be gradually increased in accordance with the number of times of unsuccessful detection, and the number of times of photographing may be increased to improve a detection probability of the indicators.

The analog electronic watch 2 according to the embodiment described above may transmit, to the terminal appliance 3, watch state information related to the state of the analog electronic watch 2 before transmitting the watch's internal time information. The watch state information is information related to a state in which the battery capacity is lowered and the group of indicators 26b to 26e are rotating differently from normal rotation, or a state in which rotation of the group of indicators 26b to 26e is stopped, such as a warning hand operation state, a power saving state, and a power break state. The controller 35 acquires the watch state information, and in a case in which the group of indicators 26b to 26e are not normally rotating, the controller 35 may also display an attention display image for prompting the user to charge the analog electronic watch 2 on the display surface 32a and quit the application. In this case, until the group of indicators 26b to 26e return to normal rotation and the watch state information is acquired, the controller 35 preferably prohibits use of the application.

Specifically, when a battery voltage is lower than a specific amount, warning hand operation is performed for a certain time for prompting the user to perform charging, the warning hand operation in which the second hand 26b intermittently moves by a distance corresponding to two seconds at intervals of two seconds. Such a state of attracting user's attention or giving warning to the user using a hand operation different from a normal hand operation is called the warning hand operation state. In the warning hand operation state, the rotational speed of the second hand 26b is more than twice as much as a normal rotational speed, so that, at the time of photographing the dial plate 26a with the terminal appliance 3, the image corresponding to the second hand 26b is blurred, and it becomes difficult to recognize the display position of the second hand 26b. Thus, the watch state information indicating the warning hand operation state is transmitted to the terminal appliance 3 immediately before the analog electronic watch 2 proceeds to the warning hand operation state to perform control such that display position detection for the group of indicators 26b to 26e is prevented from being performed, that is, display position detection is prohibited, so that power consumption can be suppressed. Alternatively, the terminal appliance 3 that has received a notification indicating that the analog electronic watch 2 is in the warning hand operation state may change exposure and shutter speed of the imaging unit 31 so that the second hand 26b rotating at high speed is not blurred, generate the image P of the indicators and the dial plate, and perform display position detection. The battery voltage returns to a voltage equal to or higher than a specified voltage, the analog electronic watch 2 notifies the terminal appliance 3 of the watch state information indicating that the analog electronic watch 2 proceeds to the normal state from the warning hand operation state. The terminal appliance 3 that has received the notification releases the prohibition of display position detection for the group of indicators 26b to 26e, and if a setting of the imaging unit 31 has been changed, returns the setting to a normal setting.

When a period in which power generation cannot be detected in the warning hand operation state continues for a certain time, or when the battery voltage is lower than the specified voltage, the rotation of the second hand 26b is stopped, and the state proceeds to a power saving state for reducing power consumption. At this point, the second hand 26b is stopped at a defined position, for example, a position indicating 12 o'clock on the dial plate 26a, so that the position is different from the display position of the second hand 26b based on the watch's internal time corresponding to the watch's internal time information received from the analog electronic watch 2 by the terminal appliance 3. Thus, the watch state information indicating that the state proceeds to the power saving state is transmitted to the terminal appliance 3 immediately before the analog electronic watch 2 proceeds to the power saving state to perform control such that display position detection for the group of indicators 26b to 26e is prohibited, so that power consumption can be suppressed. If it is determined that the analog electronic watch 2 is in the power saving state based on the watch state information, the terminal appliance 3 may perform display position detection for the group of indicators 26b to 26e while limiting the identification area AD to the defined position at which the second hand 26b stops. At this point, the terminal appliance 3 may display, on the display surface 32a, a message or an icon for prompting the user to perform charging. When the battery voltage returns to a voltage equal to or larger than the specified voltage, the analog electronic watch 2 notifies the terminal appliance 3 of the watch state information indicating that the state proceeds to the normal state from the power saving state, and the terminal appliance 3 that has received the notification releases prohibition of display position detection for the group of indicators 26b to 26e or releases the limitation on the identification area AD.

When a period in which power generation cannot be detected in the power saving state continues for a certain time, or when the battery voltage is lower than a further low specified amount, the state proceeds to a power break state for stopping the driving mechanism unit 25 and the controller 23, that is, prohibiting electric supply. At this point, the analog electronic watch 2 resets the information related to the watch's internal time information, and stops the communication unit 22 serving as a communication circuit for the terminal appliance 3. Thus, the watch state information indicating that the state proceeds to the power break state is transmitted to the terminal appliance 3 immediately before the analog electronic watch 2 proceeds to the power break state to perform control such that display position detection for the group of indicators 26b to 26e is prohibited, so that power consumption can be suppressed. At this point, if it is determined that the analog electronic watch 2 is in the power break state based on the watch state information, the terminal appliance 3 may display, on the display surface 32a, a message or an icon for prompting the user to perform charging. When the battery voltage returns to a voltage equal to or higher than the specified voltage, the analog electronic watch 2 notifies the terminal appliance 3 of the watch state information indicating that the state proceeds to the normal state from the power break state, and the terminal appliance 3 that has received the notification releases prohibition of display position detection for the group of indicators 26b to 26e.

In the embodiment and the like described above, the imaging unit 31 images the analog display unit 26 once after the user presses the shutter to generate the image P of the indicators and the dial plate, but the embodiment is not limited thereto. The imaging unit 31 may generate a plurality of images P of the indicators and the dial plate by imaging the analog display unit 26 multiple times while changing the imaging condition. For example, the controller 35 may perform image processing of combining the generated images P of the indicators and the dial plate to generate one image P of the indicators and the dial plate. Due to this, it is possible to generate the image P of the indicators and the dial plate appropriate for determination of the identification areas AS to AD and detection of the current display positions of the group of indicators 26b to 26e performed by the controller 35.

Alternatively, for example, the controller 35 may generate the image P of the indicators and the dial plate corresponding to each of the identification areas AS to AD. In this case, at the time of imaging the analog display unit 26 with the imaging unit 31, the controller 35 performs imaging four times while varying depth of field corresponding to each of the group of indicators 26b to 26e. The hour hand 26d, the minute hand 26c, and the second hand 26b are positioned on the upper side of the dial plate 26a (date plate 26e) in this order. Thus, the depth of field for each time of imaging is increased in order of the second hand 26b, the minute hand 26c, the hour hand 26d, and the dial plate 26a (date plate 26e) to be set to focus on each of the group of indicators 26b to 26e. That is, the identification area AS is determined based on the image P of the indicators and the dial plate imaged and generated at the depth of field corresponding to the second hand 26b, the identification area AM is determined based on the image P of the indicators and the dial plate imaged and generated at the depth of field corresponding to the minute hand 26c, the identification area AH is determined based on the image P of the indicators and the dial plate imaged and generated at the depth of field corresponding to the hour hand 26d, and the identification area AD is determined based on the image P of the indicators and the dial plate imaged and generated at the depth of field corresponding to the date plate 26e. Thus, each of the group of indicators 26b to 26e in the respective identification areas AS to AD comes into focus, so that erroneous detection and the like can be prevented and detection accuracy can be improved as compared with a case of causing each of the identification areas AS to AD determined from one image P of the indicators and the dial plate to be a detection target. The analog electronic watch system 1 can reduce the image processing time for detecting the current display positions of the group of indicators 26b to 26e, so that the time required for display time correction can be further reduced. In this case, at the time of imaging the analog display unit 26 with the imaging unit 31, it is preferable that the controller 35 set the depth of field to be shallow in advance, that is, to cause the second hand 26b to come into focus at the time of starting imaging. In this case, at the time of performing imaging corresponding to each of the group of indicators 26b to 26e, the depth of field is gradually increased. Alternatively, at the time of imaging the analog display unit 26 with the imaging unit 31, the controller 35 may set the depth of field to be deep in advance, that is, to cause the hour hand 26d or the date plate 26e to come into focus at the time of starting imaging.

For example, the controller 35 may generate a plurality of images P of the indicators and the dial plate each including a different number of pixels. In this case, first, the controller 35 determines the identification areas AS to AD based on the image P of the indicators and the dial plate including a small number of pixels, and detects the current display positions of the group of indicators 26b to 26e. In a case in which the current display positions of the group of indicators 26b to 26e cannot be detected based on the image P of the indicators and the dial plate including a small number of pixels, the controller 35 determines the identification areas AS to AD based on the image P of the indicators and the dial plate including a large number of pixels, and detects the current display positions of the group of indicators 26b to 26e. The analog electronic watch system 1 firstly detects the current display positions of the group of indicators 26b to 26e based on the image P of the indicators and the dial plate including a small number of pixels, that is, the image P of the indicators and the dial plate the image processing time for which is short, so that the image processing time can be reduced.

The controller 35 according to the embodiment described above may detect the fact that the group of indicators 26b to 26e are not present in a non-identification area based on a preliminary identification area before detecting the current display positions of the group of indicators 26b to 26e based on the identification areas AS to AD. In this case, the preliminary identification area is an identification area that is determined under a condition of excluding respective expected display positions of the second hand 26b, the minute hand 26c, and the hour hand 26d with respect to the dial plate 26a based on the watch's internal time information. That is, the preliminary identification area is an identification area in which the three hands 26b to 26d are estimated not to be positioned on the dial plate 26a based on the watch's internal time information. For example, the preliminary identification area is an identification area excluding the expected display positions of the second hand 26b, the minute hand 26c, and the hour hand 26d, or a predetermined area including the expected display positions (an area having a length in the rotation direction corresponding to the rotational speed of the three hands 26b to 26d). If it is determined that the three hands 26b to 26d are not positioned in the preliminary identification area, the three hands 26b to 26d are securely positioned within the identification areas AS to AC, so that the controller 35 can detect the three hands 26b to 26d within the identification areas AS to AC even in a case in which a matching degree is low in the pattern matching processing. Due to this, erroneous detection and the like can be prevented, and detection accuracy can be improved.

REFERENCE SIGNS LIST

1 ANALOG ELECTRONIC WATCH SYSTEM
2 ANALOG ELECTRONIC WATCH
21 ANTENNA (COMMUNICATION UNIT ON WATCH SIDE)
22 COMMUNICATION UNIT (COMMUNICATION UNIT ON WATCH SIDE)
23 CONTROLLER (CONTROLLER ON WATCH SIDE)
25 DRIVING MECHANISM UNIT
26 ANALOG DISPLAY UNIT
26a DIAL PLATE
26b SECOND HAND
26c MINUTE HAND
26d HOUR HAND
26e DATE PLATE
26f INDEX
3 TERMINAL APPLIANCE
31 IMAGING UNIT
32 TOUCH PANEL UNIT
32a DISPLAY SURFACE
33 ANTENNA (COMMUNICATION UNIT ON TERMINAL SIDE)
34 COMMUNICATION UNIT (COMMUNICATION UNIT ON TERMINAL SIDE)
35 CONTROLLER (CONTROLLER ON TERMINAL SIDE)
T INDEX POSITION
P IMAGE OF INDICATORS AND DIAL PLATE
PM1, PM2 ATTENTION DISPLAY IMAGE
PW1 TO PW4 ANALOG ELECTRONIC WATCH IDENTIFICATION IMAGE

The invention claimed is:

1. An analog electronic watch system comprising:
an analog electronic watch that includes
a dial plate on which indexes are formed, and
one or more indicators configured to rotate on the dial plate; and
a terminal appliance that includes
a communication unit on a terminal side configured to be able to transmit/receive at least time information about time to/from an external appliance,
an imaging unit configured to image the dial plate, and generate an image of the indicators and the dial plate including an image corresponding to the indicators and the dial plate, and
a controller on the terminal side configured to detect current display positions of the indicators based on the indexes in the image of the indicators and the dial plate, generate current display time information based on the current display positions, and generate display time correction information based on a difference between the current display time information and watch's internal time information received from the analog electronic watch, wherein
the controller on the terminal side
outputs, to the analog electronic watch, a rotation stop signal for stopping rotation of the indicators before performing imaging with the imaging unit,
detects the current display positions of the indicators within identification areas that are part of the image of the indicators and the dial plate and include the indexes and expected display positions of the indicators based on the watch's internal time information, and
outputs the display time correction information to the analog electronic watch, and
the analog electronic watch
stops the rotation of the indicators based on the rotation stop signal, and
corrects display positions of the indicators based on the display time correction information.

2. The analog electronic watch system according to claim 1, wherein
the identification area corresponding to the indicator, among the two or more indicators, a relative position of which is distant from the indexes as compared with the other indicators is larger than the identification areas corresponding to the other indicators in a radial direction in rotation of the indicators.

3. The analog electronic watch system according to claim 1, wherein
the identification area corresponding to the indicator, among the two or more indicators, a rotation amount of which per one time is smaller than the rotation amounts of the other indicators is smaller than the identification areas corresponding to the other indicators in the rotation direction of the indicators.

4. The analog electronic watch system according to claim 1, wherein
when it is determined that the current display position of each of the indicators is not able to be detected within the corresponding identification area, the controller on the terminal side expands the identification area.

5. The electronic watch system according to claim 1, wherein
the terminal appliance includes a display surface, and a touch panel unit configured to detect an operation input position operated by a user on the display surface, and
the controller on the terminal side
displays the image of the indicators and the dial plate on the display surface, and prompts the user to perform an operation input on an index position corresponding to 12 o'clock on the dial plate before determining the identification areas, and
when it is determined that the operation input is performed, determines the identification areas based on the watch's internal time information and operation input position information for the image of the indicators and the dial plate.

6. The analog electronic watch system according to claim 1, wherein
the terminal appliance includes a display surface, and a touch panel unit configured to detect an operation input position operated by a user on the display surface, and
the controller on the terminal side
displays, on the display surface, a plurality of analog electronic watch identification images related to information about the indicators and the dial plate including shape information of the indicators and the dial plate for each analog electronic watch stored in the terminal appliance in advance, and prompts the user to perform an operation input for selecting one of the analog electronic watch identification images before detecting the current display positions of the indicators, and when it is determined that the operation input is performed, detects the current display positions of the indicators within the identification areas based on the information about the indicators and the dial plate related to the analog electronic watch identification image corresponding to the operation input position among the analog electronic watch identification images.

7. An analog electronic watch comprising:

a dial plate on which indexes are formed;

one or more indicators configured to rotate on the dial plate;

a driving mechanism unit configured to rotate the indicators;

a communication unit on a watch side configured to be able to transmit/receive at least time information about time to/from an external appliance; and a controller on the watch side that includes at least watch's internal time, and is configured to control rotational driving of the indicators performed by the driving mechanism unit based on the watch's internal time, wherein the controller on the watch side stops a rotation of the indicators rotated by the driving mechanism unit based on a rotation stop signal from a terminal appliance, and corrects display positions of the indicators based on display time correction information from the terminal appliance that is based on a difference between current display time information that is generated based on current display positions of the indicators and watch's internal time information received from the analog electronic watch, the current display positions being detected in identification areas as part of an image of the indicators and the dial plate including an image corresponding to the indicators and the dial plate, the identification areas including the indexes and expected display positions of the indicators based on watch's internal time information.

\* \* \* \* \*